United States Patent
Kim et al.

(10) Patent No.: US 12,462,593 B2
(45) Date of Patent: Nov. 4, 2025

(54) IMAGE PROCESSING AND AUTHENTICATION OF UNCLONABLE FUNCTIONS

(71) Applicant: Purdue Research Foundation, West Lafayette, IN (US)

(72) Inventors: Young L Kim, West Lafayette, IN (US); Jung Woo Leem, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 392 days.

(21) Appl. No.: 17/768,293

(22) PCT Filed: Aug. 15, 2020

(86) PCT No.: PCT/US2020/046579
§ 371 (c)(1),
(2) Date: Apr. 12, 2022

(87) PCT Pub. No.: WO2021/076216
PCT Pub. Date: Apr. 22, 2021

(65) Prior Publication Data
US 2024/0127614 A1  Apr. 18, 2024

Related U.S. Application Data

(60) Provisional application No. 62/945,816, filed on Dec. 9, 2019, provisional application No. 62/915,666, filed (Continued)

(51) Int. Cl.
G06V 20/00 (2022.01)
G06T 5/70 (2024.01)
H04L 9/32 (2006.01)

(52) U.S. Cl.
CPC ............... *G06V 20/95* (2022.01); *G06T 5/70* (2024.01); *H04L 9/3278* (2013.01); *G06T 2207/10064* (2013.01)

(58) Field of Classification Search
CPC . G06V 20/95; G06T 5/70; G06T 2207/10064; H04L 9/3278
See application file for complete search history.

(56) References Cited

U.S. PATENT DOCUMENTS 5,592,561 A  1/1997  Moore
10,002,362 B1  6/2018  Endress et al.
(Continued)

FOREIGN PATENT DOCUMENTS

CN  110062940 A  7/2019
EP  3 340 213 A1  6/2018
(Continued)

OTHER PUBLICATIONS

Naik Riddhi, An Efficient Algorithm for Dynamic Key Generation for Image Encryption (Year: 2015).*
(Continued)

*Primary Examiner* — Stephen S Hong
*Assistant Examiner* — Carl E Barnes, Jr.
(74) *Attorney, Agent, or Firm* — Piroozi-IP, LLC

(57) ABSTRACT

A method of authenticating an item is disclosed which includes applying light to an item, wherein the item includes a random distribution of fluorescent particles disposed thereon, capturing one or more images from the item, generating a cryptographic pattern from the one or more captured images by a host processing system, communicating the cryptographic pattern to a remote processing system having a plurality of cryptographic keys in a database each uniquely associated with a corresponding item, comparing the cryptographic pattern with the plurality of cryptographic
(Continued)

keys in the database, and communicating a positive evaluation for authentication to the host processing system if a match is found between one of the plurality of cryptographic keys and the communicated cryptographic pattern.

20 Claims, 22 Drawing Sheets

Related U.S. Application Data on Oct. 16, 2019, provisional application No. 62/915,667, filed on Oct. 16, 2019.

(56) References Cited

U.S. PATENT DOCUMENTS

| | | | |
|---|---|---|---|
| 10,438,356 B2* | 10/2019 | Dacosta | A61B 5/0071 |
| 2005/0099476 A1* | 5/2005 | Chinea | B41M 3/144 |
| | | | 347/100 |
| 2006/0095778 A1 | 5/2006 | He et al. | |
| 2009/0008924 A1 | 1/2009 | Ophey et al. | |
| 2009/0274298 A1 | 11/2009 | Schmitt-Lewen et al. | |
| 2013/0299591 A1 | 11/2013 | Marka et al. | |
| 2013/0329052 A1* | 12/2013 | Chew | G06T 7/0008 |
| | | | 348/159 |
| 2014/0119615 A1 | 5/2014 | Mercolino et al. | |
| 2018/0006813 A1* | 1/2018 | Van Der Leest | G09C 1/00 |
| 2018/0174158 A1* | 6/2018 | Endress | H04L 9/3247 |
| 2018/0211033 A1 | 7/2018 | Aditham et al. | |

FOREIGN PATENT DOCUMENTS

| | | |
|---|---|---|
| WO | 2016172503 | 10/2016 |
| WO | 2018204319 | 11/2018 |

OTHER PUBLICATIONS

Naveed Akhtar, Hyperspectral Recovery from RGB Images using Gaussian Processes, Oct. 2018 (Year: 2018).*
Versatile and Validated Optical Authentication System Based on Physical Unclonable Functions (Year: 2019).*
Naveed Akhtar, Hyperspectral Recovery from RGB Images using Gaussian Processes, Jul. 2018 (Year: 2018).*
Green-Light-Activated Photoreaction via Jung Woo Leem, Genetic Hybridization of Far-Red Fluorescent Protein and Silk (Year: 2018).*
Dong Wook Kim, Novel fabrication of fluorescent silk utilized in biotechnological and medical applications (Year: 2015).*
Thurber et al., In vivo bioresponses to silk proteins. Biomaterials 71, 145-157 (2015).
Choi et al., Anderson light localization in biological nanostructures of native silk. Nature Communications 9, 452 (2018).
Leem et al., Scalable and continuous nanomaterial integration with transgenic fibers for enhanced photoluminescence. Materials Horizons 4, 281-289 (2017).
Leem et al., Green-light-activated photoreaction via genetic hybridization of far-red fluorescent protein and silk. Advanced Science 5, 1700863 (2018).
Kim et al., Dissolvable films of silk fibroin for ultrathin conformal bio-integrated electronics. Nature Materials 9, 511-517 (2010).
Qi et al., A review of structure construction of silk fibroin biomaterials from single structures to multi-level structures. International Journal of Molecular Sciences 18, 237 (2017).
Cao et al., Biodegradation of silk biomaterials. International Journal of Molecular Sciences 10, 1514-1524 (2009).
Marelli et al., Silk fibroin as edible coating for perishable food preservation. Scientific Reports 6, 25263 (2016).
Tao et al., Silk-based conformal, adhesive, edible food sensors. Advanced Materials 24, 1067-1072 (2012).
Lievens et al., Genetically modified animals: Options and issues for traceability and enforcement. Trends in Food Science & Technology 44, 159-176 (2015).
Ostoja-Starzewski, Random-fields and processes in mechanics of granular-materials. Mechanics of Materials 16, 55-64 (1993).
Duran, Sands, powders and grains. An introduction to the physics of granular materials. (Springer-Verlag, New York, 2000).
Maiti et al., A systematic method to evaluate and compare the performance of physical unclonable functions. Embedded systems design with FPGAs. pp. 245-267 (Springer-Verlag, New York, 2013).
Suh et al., Physical unclonable functions for device authentication and secret key generation. 2007 44th ACM/IEEE Design Automation Conference, vols. 1 and 2, 9-14 (2007).
Maes et al., Secure key generation from biased PUFs: Extended version. Journal of Cryptographic Engineering 6, 121-137 (2016).
Rukhin et al., A statistical test suite for random and pseudorandom number generators for cryptographic applications. vol. National Institute of Standards and Technology (NIST), Gaithersburg, MD (NIST special publication 800-22, 2010).
Che et al., Analysis of entropy in a hardware-embedded delay PUF. Cryptography 1, 8 (2017).
Gong et al., Pitfall of the strongest cells in static random access memory physical unclonable functions. Sensors 18, 1776 (2018).
Han et al., Quantum-dot-tagged microbeads for multiplexed optical coding of biomolecules. Nature Biotechnology 19, 631-635 (2001).
Yoon et al: "Hyperspectral imaging using RGB color for foodborne pathogen detection", Journal of Electronic Imaging, SP IE—International Society for Optical Engineering, US, vol. 24, No. 4, Jul. 1, 2015.
Carnicer et al., Authentication of gold nanoparticle encoded pharmaceutical tablets using polarimetric signatures. Optics Letters 41, 4507-4510 (2016).
Shu, Catherine, TruTag raises $7.5 million Series C for tiny, edible barcodes that can be placed on pills, food and vaping systems, TechCrunch, Oct. 17, 2019.
Herder et al., Physical unclonable functions and applications: A tutorial. Proceedings of the IEEE 102, 1126-1141 (2014).
Gao et al., Emerging physical unclonable functions with nanotechnology. IEEE Access 4, 61-80 (2016).
Arppe et al., Physical unclonable functions generated through chemical methods for anti-counterfeiting. Nature Reviews Chemistry 1, 0031 (2017).
Mcgrath et al., A PUF taxonomy. Applied Physics Reviews 6, 011303 (2019).
Rührmair, Disorder-based security hardware: An overview. Security system design and trustable computing (eds. Chang, C. H. & Potkonjak, M.) pp. 3-37 (Springer, Switzerland, 2016).
Pappu et al., Physical one-way functions. Science 297, 2026-2030 (2002).
Horstmeyer et al., Physical key-protected one-time pad. Scientific Reports 3, 3543 (2013).
Goorden et al., Quantum-secure authentication of a physical unclonable key. Optica 1, 421-424 (2014).
Hu et al., Physically unclonable cryptographic primitives using self-assembled carbon nanotubes. Nature Nanotechnology 11, 559-565 (2016).
Cao et al., Optical identification using imperfections in 2D materials. 2D Materials 4, 045021 (2017).
Alharbi et al., Physically unclonable cryptographic primitives by chemical vapor deposition of layered MoS2. ACS Nano 11, 12772-12779 (2017).
Hwang et al., Nano-electromechanical switch based on a physical unclonable function for highly robust and stable performance in harsh environments. ACS Nano 11, 12547-12552 (2017).
Carro-Temboury et al., An optical authentication system based on imaging of excitation-selected lanthanide luminescence. Science Advances 4, e1701384 (2018).
Arppe-Tabbara et al., Versatile and validated optical authentication system based on physical unclonable functions. ACS Applied Materials & Interfaces 11, 6475-6482 (2019).
Wali et al., Biological physically unclonable function. Communications Physics 2, 39 (2019).
Mariani et al.m Biomaterials: Foreign bodies or tuners for the immune response?. International Journal of Molecular Sciences 20, 636 (2019).

(56) References Cited

OTHER PUBLICATIONS

Rockwood et al., Materials fabrication from Bombyx mori silk fibroin. Nature Protocols 6, 1612-1631 (2011).

Tao et al., Silk materials—A road to sustainable high technology. Advanced Materials 24, 2824-2837 (2012).

Valsesia et al., User Authentication via PRNU-Based physical unclonable functions. IEEE Translations on Information Forensics and Security 12, 1941-1956 (2017).

U.S. Food and Drug Administration, Summary of Color Additives for Use in the United States in Foods, Drugs, Cosmetics, and Medical Devices, May 2015.

Corradini et al., Identifying and selecting edible luminescent probes as sensors of food quality, AIMS Biophysics 3, 319-339 (2016).

Day et al., The fluorescent protein palette: tools for cellular imaging. Chemical Society Reviews 38, 2887 (2009).

Mackey et al., A review of existing and emerging digital technologies to combat the global trade in fake medicines. Expert Opinion on Drug Safety 16, 587-602 (2017).

Sample, Fake drugs kill more than 250,000 children a year, doctors warn. The Guardian, Mar. 11, 2019.

Liang et al., Sexual medicine online risks to health-the problem of counterfeit drugs. Nature Reviews Urology 9, 480-482 (2012).

Clark, Rise in online pharmacies sees counterfeit drugs go global. Lancet 386, 1327-1328 (2015).

Blackstone et al., The health and economic effects of counterfeit drugs. American Health and Drug Benefits 7, 216-223 (2014).

Williams et al., The real impact of counterfeit medications. US Pharmacists 39, 44-46 (2014).

Fittler et al., A challenge for healthcare but just another opportunity for illegitimate online sellers: Dubious market of shortage oncology drugs. Plos One 13, e0203185 (2018).

Mackey et al., Digital danger: A review of the global public health, patient safety and cybersecurity threats posed by illicit online pharmacies. British Medical Bulletin 118, 115-131 (2016).

Venhuis et al., Oncology drugs in the crosshairs of pharmaceutical crime. Lancet Oncology 19, E209-E217 (2018).

Kovacs et al., Technologies for detecting falsified and substandard drugs in low and middle-income countries. Plos One 9, e90601 (2014).

Davison, Pharmaceutical anti-counterfeiting: Combating the real danger from fake drugs. John Wiley & Sons, Inc., New Jersey, (2011).

Shanley, Anticounterfeiting: In search of the unhackable. Pharmaceutical Technology 42, 56-58 (2018).

Huang et al., Unbreakable codes in electrospun fibers: Digitally encoded polymers to stop medicine counterfeiting. Advanced Materials 22, 2657-2661 (2010).

Han et al., Lithographically encoded polymer microtaggant using high-capacity and error-correctable QR code for anti-counterfeiting of drugs. Advanced Materials 24, 5924-5929 (2012).

Bae et al., Self-organization of maze-like structures via guided wrinkling. Science Advances 3, e1700071 (2017).

Edinger et al., QR encoded smart oral dosage forms by inkjet printing. International Journal of Pharmaceutics 536, 138-145 (2018).

Rehor et al., Biodegradable microparticles for simultaneous detection of counterfeit and deteriorated edible products. Small 13, 1701804 (2017).

Kim et al., Porous microwells for geometry-selective, large-scale microparticle arrays. Nature Materials 16, 139-146 (2017).

Smith et al., Plasmonic nanoparticles as a physically unclonable function for responsive anti-counterfeit nanofingerprints. Advanced Functional Materials 26, 1315-1321 (2016).

Akhtar et al., "Hyperspectral recovery from RGB images using Gaussian Processes," Journal of Latex Class Files, vol. 14, No. 8, Aug. 2015.

* cited by examiner

IMAGE PROCESSING AND AUTHENTICATION OF UNCLONABLE FUNCTIONS

CROSS-REFERENCE TO RELATED APPLICATIONS

The present patent application is a 35 U.S.C. § 371 Nationalization Application of and claims the priority benefit of the International Patent Application Serial No. PCT/US20/46579 filed Aug. 15, 2020, which is related to and claims the priority benefit of U.S. Provisional Patent Application Ser. No. 62/915,666 filed 16 Oct. 2019 entitled "IMAGE PROCESSING AND AUTHENTICATION OF EDIBLE UNCLONABLE FUNCTIONS"; U.S. Provisional Patent Application Ser. No. 62/915,667 filed 16 Oct. 2019 entitled "EDIBLE UNCLONABLE FUNCTIONS"; and U.S. Provisional Patent Application Ser. No. 62/945,816 filed 9 Dec. 2019 entitled "HYPERSPECTRAL IMAGE CONSTRUCTION OF BIOLOGICAL TISSUE FOR BLOOD HEMOGLOBIN ANALYSIS USING A SMARTPHONE", the contents of each of which are hereby incorporated by reference in its entirety into the present disclosure.

STATEMENT REGARDING GOVERNMENT FUNDING

This invention was made with government support under FA2386-17-1-4072 awarded by US Air Force Office of Scientific Research. The government has certain rights in the invention.

TECHNICAL FIELD

The present disclosure generally relates to counterfeit measures, and in particular, to an arrangement concerning an edible unclonable function counterfeit measure.

BACKGROUND

This section introduces aspects that may help facilitate a better understanding of the disclosure. Accordingly, these statements are to be read in this light and are not to be understood as admissions about what is or is not prior art.

Counterfeit medicines have become ubiquitous, presenting myriad problems. This problem of counterfeit medicines is not a new one, but is becoming a tremendous burden to society in all countries. While 'fake' pharmaceutical products can be explicitly categorized into a plurality of categories including substandard, falsified, counterfeit, and diverted ones, they are all often referred to, as a single group, counterfeit medicines. They pose a significant threat to patient safety and public health as well as cause heavy economic losses in developed and less developed countries. As a devastating example, counterfeit drugs for malaria and pneumonia treatments cause estimated 250,000 child deaths each year. Counterfeit medicines of both lifestyle drugs (e.g. treatments for erectile dysfunction) and lifesaving drugs (e.g. treatments for cancer, malaria, diabetes, etc.) are increasingly being produced in developed and developing countries, in part due to the increased public use of online pharmacies. In addition, as an infringement of intellectual properties, scientific innovations and financial rewards in pharmaceutical companies are undermined by the widespread counterfeiting of medicine. The health and economic consequences of counterfeit medicines are far more serious in low- and middle-income countries. It is estimated that counterfeit medicines account for 10% of the global pharmaceutical trade and more than 20-30% of all medicines in Africa, Asia, and the Middle East.

There are a variety of approaches for detecting counterfeit medicines and for offering possible solutions for reducing the threat. Traditionally, analytical chemistry and spectroscopy technologies have been used to identify counterfeit medicines by detecting chemical signatures of major ingredients. However these techniques require sophisticated and expensive machines and have limited accuracy based on recognizing of such main ingredients. Other techniques include marking and printing on the medicine surface at various levels of resolution using lasers and other proprietary technologies, which modify the outer surface or coating of tablets or capsules, however, this technique is prone to duplication by counterfeiters. Recently, digital anti-counterfeit technologies have played a more significant role in authentication and supply chain. Package-level barcodes and radio frequency identification (RFID) are commonly used for instantaneous remote authentication. Several mobile technologies have been introduced for authentication services, track and trace solutions, and medicine recognitions. Detrimentally, such authentication and security techniques are symmetric; that is, if illegitimate manufacturers or sellers have access to the same techniques, it would be possible for them to create clones. An ideal authentication technology should be asymmetric with a form of on-dose authentication which can be directly swallowed and digestible. Specifically, on-dose (or in-dose) authentication means that every individual pill or dose is verified as genuine in the absence of packaging. Even if the original packaging is not retained by pharmacists or patients, the possibility of ingestion of counterfeit medicines is substantially eliminated. Indeed, the packaging information is often unavailable; pills are sold in small quantities and individual strips dispensed by pharmacists. On-dose authentication maximally reduces the opportunity for illegitimate sellers to use expired, counterfeit, or substandard drugs.

In this respect, a few promising technologies have recently been introduced with the potential of digital authentication, including digitally encoded polymers, QR-coded microtaggants and advanced wrinkle-based tags, QR code printing of active pharmaceutical ingredients, encoded-multifunctional hydrogel microparticles, large-scale microparticle arrays, encoded metal nanomaterials, and silica microtags. However, such materials are often not ideal from an oral intake safety perspective. These approaches rely on biocompatible and biodegradable yet exogenous materials, such as polystyrene, cellulose-acetate-phthalate (CAP), poly lactic-co-glycolic acid (PLGA), poly ethylene glycol (PEG), poly ethylene glycol diacrylate (PEGDA), silver, gold, and silica. Depending on which authentication methodology is used, a robust image processing technique is needed but yet unrealized.

Therefore, there is an unmet need for a robust imaging approach to provide asymmetric authentication for pharmaceuticals to combat the widespread availability of counterfeits.

SUMMARY

A method of authenticating an item disclosed. The method includes applying light to an item. The item includes a random distribution of fluorescent particles disposed thereon. The method also includes capturing one or more images from the item, and generating a cryptographic pattern from the one or more captured images by a host processing system. The method also includes communicating the cryptographic pattern to a remote processing system having a plurality of cryptographic keys in a database each uniquely associated with a corresponding item. The method further includes comparing the cryptographic pattern with the plurality of cryptographic keys in the database, and communicating a positive evaluation for authentication to the host processing system if a match is found between one of the plurality of cryptographic keys and the communicated cryptographic pattern.

According to one embodiment, in the above method, the evaluation for authentication is based on a statistical match between one of the plurality of cryptographic keys and the cryptographic pattern.

According to one embodiment, in the above method the statistical match is based on linear regression with a predetermined threshold for a P-value.

According to one embodiment, the above method further includes: reducing noise in the one or more captured images, detecting the randomly distributed fluorescent particles amongst the N×M pixels in the one or more captured images, binarizing the one or more captured images based on applying one of a 1 or 0 to pixels where a fluorescent particle has been detected and apply a complementary 0 or 1 to pixels where no fluorescent particles have been detected in order to generate a binarized data stream, and compressing the binarized data stream in order to generate the cryptographic pattern.

According to one embodiment, in the above method the compression of the binarized data is based on a von Neumann compression.

According to one embodiment, the above method further includes filtering the light source to provide selective wavelengths.

According to one embodiment, in the above method the randomly distributed fluorescent particles include a plurality of fluorescent compounds, each generating a different fluorescence in response to a selected light wavelength, whereby the cryptographic pattern is a linear combination of the compressed binarized data stream associated with sequentially generated fluorescence responses.

According to one embodiment, the above method further includes using a predetermined number of bits of the compressed binarized data streams associated with each generated fluorescence to generate the linear combination of the compressed binarized data stream.

According to one embodiment, in the above method the predetermined number of bits is set based on the density of fluorescent particles.

According to one embodiment, in the above method the plurality of fluorescent compounds include multiple compounds.

A system of authenticating an item is also disclosed. The system includes a remote processing system, configured to hold a plurality of cryptographic keys in a database each uniquely associated with a corresponding item. The system further includes a light source, configured to apply light to an item, wherein the item includes a random distribution of fluorescent particles disposed thereon. Additionally, the system includes an image capture device having an N×M imaging sensor, configured to capture one or more images each having N×M pixels from the item. The system further includes a host processing system, configured to: generate a cryptographic pattern from the captured image, and communicate the cryptographic pattern to the remote processing system. The remote processing system is configured to compare the cryptographic pattern with the plurality of cryptographic keys in the database, and communicate a positive evaluation for authentication to the host processing system if a match is found between one of the plurality of cryptographic keys and the received cryptographic pattern.

According to one embodiment, in the above system the evaluation for authentication is based on a statistical match between one of the plurality of cryptographic keys and the cryptographic pattern.

According to one embodiment, in the above system the statistical match is based on linear regression with a predetermined threshold for a P-value According to one embodiment, in the above system the host processing system is further configured to reduce noise in the one or more captured images, detect the randomly distributed fluorescent particles amongst the N×M pixels in the one or more captured images, binarize the one or more captured images based on applying one of a 1 or 0 to pixels where a fluorescent particle has been detected and apply a complementary 0 or 1 to pixels where no fluorescent particles have been detected in order to generate a binarized data stream, and compress the binarized data stream in order to generate the cryptographic pattern.

According to one embodiment, in the above system the compression of the binarized data is based on a von Neumann compression.

According to one embodiment, in the above system the light source is filtered to provide selective wavelengths.

According to one embodiment, in the above system the randomly distributed fluorescent particles include a plurality of fluorescent compounds, each generating a different fluorescence in response to a selected light wavelength, whereby the cryptographic pattern is a linear combination of the compressed binarized data stream associated with sequentially generated fluorescence responses.

According to one embodiment, in the above system a predetermined number of bits of the compressed binarized data streams associated with each generated fluorescence is used to generate the linear combination of the compressed binarized data stream.

According to one embodiment, in the above system the predetermined number of bits is set based on the density of fluorescent particles.

According to one embodiment, in the above system the plurality of fluorescent compounds include multiple compounds.

Another method of authenticating an item is also disclosed. The method includes applying light to an item, wherein the item includes a distribution of colored particles disposed thereon, capturing one or more RGB images from the item by an image capturing device, each RGB image producing a channel data stream from one of Red, Green, and Blue channels of the device, generating a cryptographic pattern from the one or more captured RGB images by a host processing system, based on: receiving a hyperspectral dataset representing a priori hyperspectral data of items of a population of interest, pairing the corresponding Red, Green, and Blue data streams with the hyperspectral dataset, obtaining a transformation matrix adapted to convert an item-specific RGB image dataset into an item-specific hyperspectral dataset for the optical imaging device, generating an item-specific hyperspectral dataset using the transformation matrix, determining the cryptographic pattern from the item-specific hyperspectral dataset, communicating the cryptographic pattern to a remote processing system having a plurality of cryptographic keys in a database each uniquely associated with a corresponding item, comparing the cryptographic pattern with the plurality of cryptographic keys in the database, and communicating a positive evaluation for authentication to the host processing system if a match is found between one of the plurality of cryptographic keys and the communicated cryptographic pattern.

According to one embodiment, in the above method the evaluation for authentication is based on a statistical match between one of the plurality of cryptographic keys and the cryptographic pattern.

According to one embodiment, in the above method the statistical match is based on linear regression with a predetermined threshold for a P-value.

According to one embodiment, the above method further includes reducing noise in the one or more captured images, detecting the randomly distributed particles amongst the N×M pixels in the one or more captured images, binarizing the one or more captured images based on applying one of a 1 or 0 to pixels where a particle has been detected and apply a complementary 0 or 1 to pixels where no particles have been detected in order to generate a binarized data stream, and compress the binarized data stream in order to generate the cryptographic pattern.

According to one embodiment, in the above method the compression of the binarized data is based on a von Neumann compression.

According to one embodiment, the above method further includes filtering the light source to provide selective wavelengths.

According to one embodiment, in the above method the randomly distributed particles include a plurality of fluorescent compounds, each generating a different fluorescence in response to a selected light wavelength, whereby the cryptographic pattern is a linear combination of the compressed binarized data stream associated with sequentially generated fluorescence responses.

According to one embodiment, the above method further includes using a predetermined number of bits of the compressed binarized data streams associated with each generated fluorescence to generate the linear combination of the compressed binarized data stream.

According to one embodiment, in the above method the predetermined number of bits is set based on the density of particles.

According to one embodiment, in the above method the plurality of fluorescent compounds include multiple compounds.

DETAILED DESCRIPTION

Figure 1A:
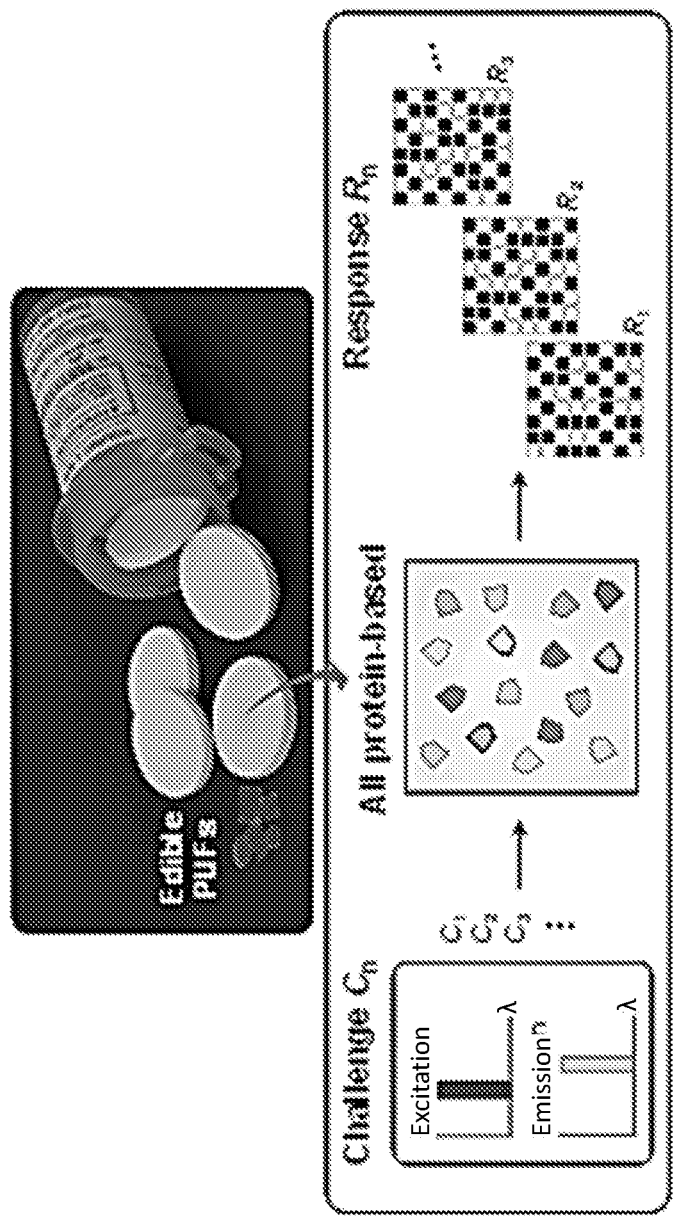
FIG. 1a is a schematic of edible physically unclonable functions (PUFs) for use with pharmaceuticals according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

One excellent way for guaranteeing high security of on-dose authentication and protection against counterfeiting medicines is to utilize physically unclonable functions (PUFs). A PUF depends on the uniqueness of its physical microstructure that defines the PUF. This uniqueness depends on myriad random physical factors introduced during manufacturing; and given that these factors are unpredictable and uncontrollable, duplication is substantially impossible. A PUF does not use a single encryption key that can possibly be decoded and used without authorization. Instead, a PUF implements a challenge-response authentication to authenticate the associated microstructure. When a physical stimulus is applied to the structure, while it reacts in an unpredictable way, it reacts in a repeatable fashion. The applied stimulus is called a challenge, and the reaction of the PUF is called the associated response. Such a specific challenge and its corresponding response are held in a secure database, and thus authentication can be checked against such a database. The challenge-response and its communication with the secured database can be encrypted for added security.

Importantly, PUFs can be asymmetric such that it is easy to make a PUF, but is extremely challenging for counterfeiters to create a clone. Once an output response is read from the database, it cannot be re-used as well. The information on dose, frequency, and caution can be encoded with PUF as well for user adherence.

For digital on-dose PUFs, the present disclosure presents silk proteins and fluorescent proteins as edible and digestible photonic biomaterials. From an edible perspective, important considerations include digestibility and nonallergenic properties. Towards this end, endogenous natural materials or biomaterials are chosen for on-dose applications. Importantly, silk proteins (i.e. fibroin) have excellent intrinsic functionality, biocompatibility, and low immunogenicity with minimal inflammatory and immune responses. Naturally-derived silk fibroin, without any external treatment, is dissolved in an aqueous solution. Silk proteins are also degradable and the degradation rate is controllable by using different silk regeneration and fabrication methods. More relevantly, silk proteins are edible and digestible. In addition, fluorescent proteins have been introduced into the food supply from genetically modified food. The potential toxicity and allergenicity are minimal with ingestion of, e.g., green fluorescent protein.

To this end, the present disclosure provides an image processing approach for authenticating an all protein-based PUFs that generate cryptographic keys with interactive multiple challenge-response pairs for on-dose authentication and anti-counterfeiting of medicines. However, it should be appreciated that the PUF according to the present disclosure can take many shapes and be made of many different materials. The edible embodiment is for use with consumable goods including pharmaceuticals. However, the same imaging techniques discussed herein can be used with respect to any such PUF, edible or non-edible. Therefore, no limitation is intended by emphasizing the edible aspect of the PUF. For example, the PUF can be included in a variety of goods, e.g., a parcel delivery package that its authenticity can be verified with a remote server prior to opening to ensure security of the package.

With respect to edible PUFs, the edible PUFs are made from silk (i.e. *Bombyx mori*) protein microparticles that are genetically fused with different fluorescent proteins, including enhanced cyan fluorescent protein (eCFP), enhanced green fluorescent protein (eGFP), enhanced yellow fluorescent protein (eYFP), and mKate2 (far-red) fluorescent protein. However, the same arrangement can be applied to other biocompatible material, including edible dyes, edible proteins, and edible polymers. Detailed examples of such materials are provided in the sister patent application filed on the same day as the instant patent application, entitled: EDIBLE UNCLONABLE FUNCTIONS.

Figure 1B:
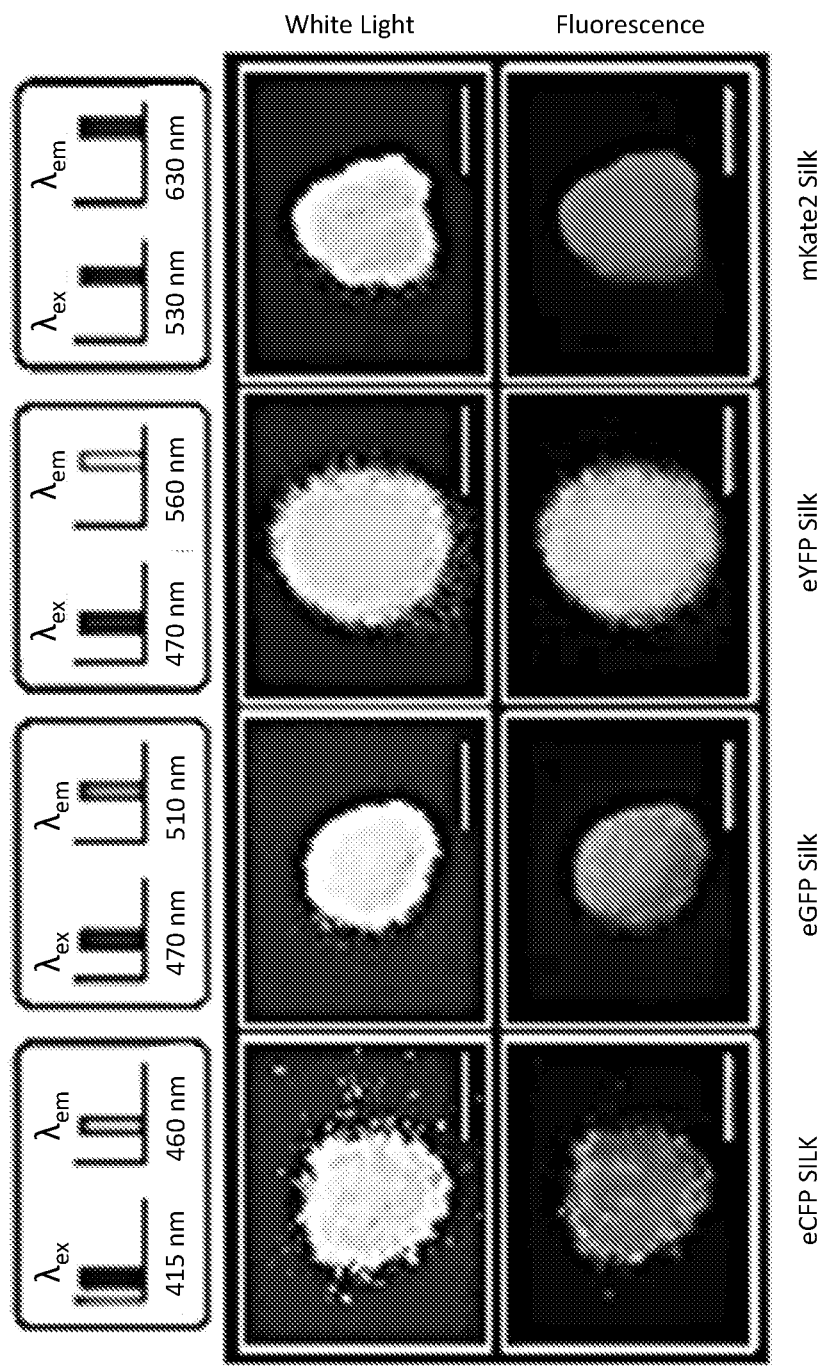
FIG. 1b shows schematics of photoluminescent properties of fluorescent silk proteins that are used to realize multiple challenge-response pairs in an edible PUF platform for heightened security according to the present disclosure.
Figure 1C:
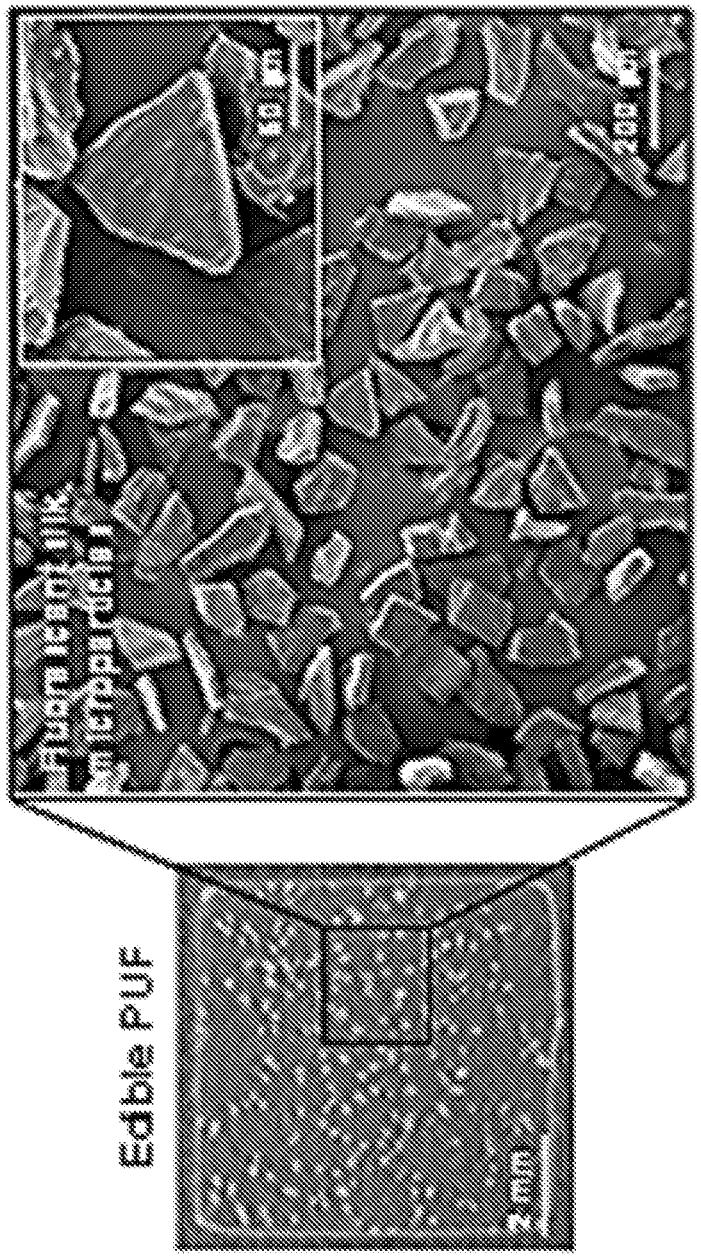
FIG. 1c is a scanning electron microscope (SEM) output of an edible PUF device in which fluorescent silk microparticles are embedded in a thin silk film.
Figure 1D:
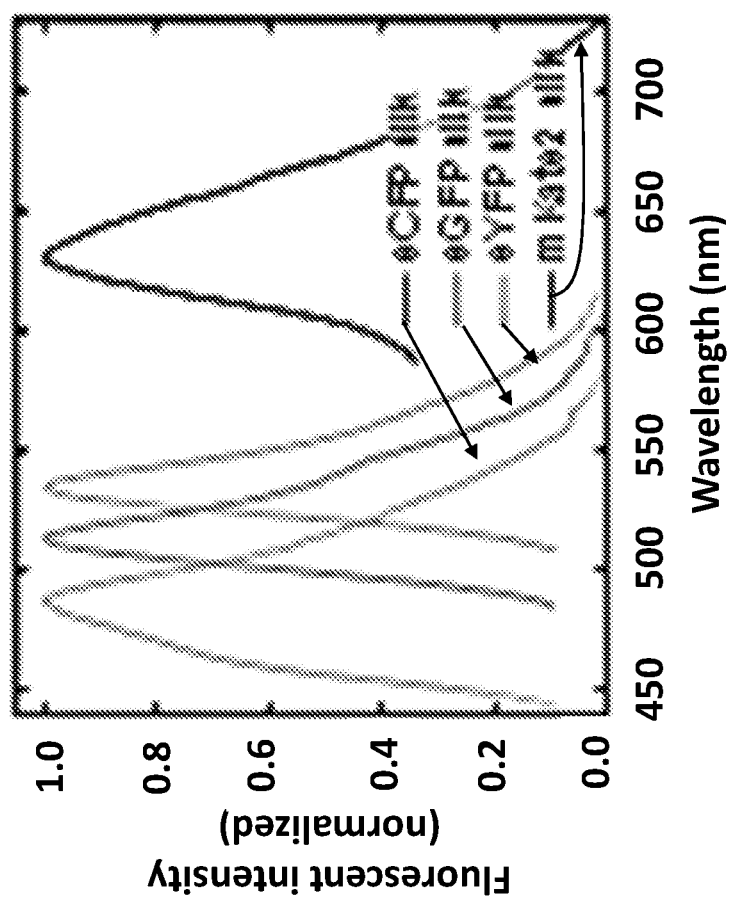
FIG. 1d is an emission spectra of particulate eCFP, eGFP, eYFP and mKate2 silk which cover a relatively broad wavelength range in the visible light, while the emission peak positions are not overlapped among others.
Figure 1E:
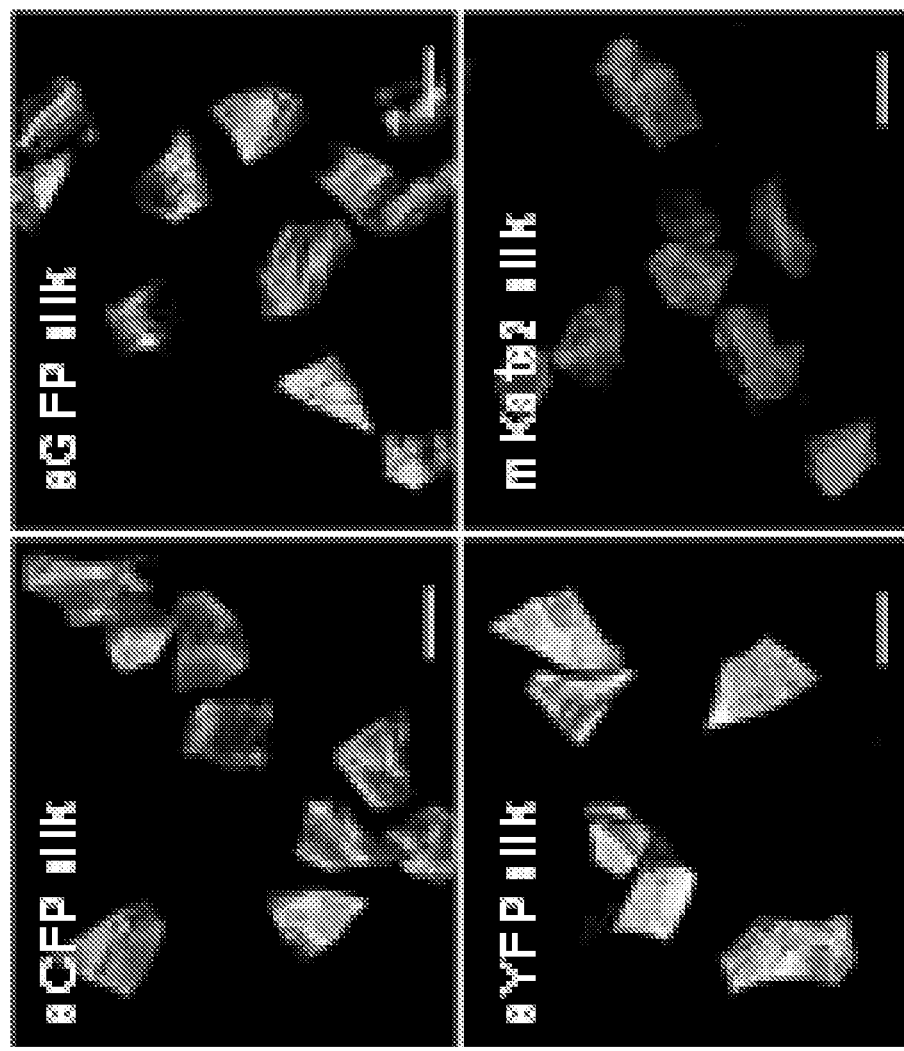
FIG. 1e provides confocal fluorescence microscopy images of the corresponding fluorescent silk microparticles under excitation of 405, 458, 514, or 561 nm for eCFP, eGFP, eYFP and mKate2 silk, respectively.

Referring to FIG. 1a, a schematic of edible PUFs for use with pharmaceuticals is shown. FIG. 1a shows a schematic illustration of an on-dose PUF with a photograph of covert and transparent PUFs attached on the surface of medicines. The PUF device is composed of proteins from fluorescent proteins and silk that are edible and digestible. The distinct photoluminescent properties of fluorescent proteins in silk provide the parametric support of unique challenge-response pairs. In reaction by an input challenge, the edible PUF generates its corresponding output response. FIG. 1b shows that the photoluminescent properties of fluorescent silk proteins are used to realize multiple challenge-response pairs in an edible PUF platform for heightened security. Importantly, challenge-response pairs differentiate the protein-based PUFs of the present disclosure from other common unique objects and tags. In reaction to optical challenges, defined by a unique set of excitation and emission bands of different fluorescent proteins, the edible PUF made of silk protein (i.e. fibroin) and fluorescent proteins generates distinct output responses. The source of entropy is randomly distributed fluorescent silk microparticles seamlessly embedded in a covert thin transparent silk film. FIG. 1c is a scanning electron microscope (SEM) output of an edible PUF device in which fluorescent silk microparticles are embedded in a thin silk film. FIG. 1c shows the SEM output of fluorescent silk microparticles with zeolite-like shapes. FIG. 1d is an emission spectra of particulate eCFP, eGFP, eYFP and mKate2 silk which cover a relatively broad wavelength range in the visible light, while the emission peak positions are not overlapped among others. FIG. 1e provides confocal fluorescence microscopy images of the corresponding fluorescent silk microparticles under excitation of 405, 458, 514, or 561 nm. The scale bar is 100 μm. The size of fluorescent silk microparticles is 99.3±7.9 μm (mean±standard deviation). First, we take advantage of four different fluorescent proteins (i.e. eCFP, eGFP, eYFP, and mKate2) that have specific excitation and emission peaks in the visible wavelength range (provided in Table 1-1).

TABLE 1-1

Optical properties of fluorescent proteins genetically hybridized with silk

| Fluorescent protein | Excitation maximum (nm) | Emission maximum (nm) | Extinction coefficient ($M^{-1}$ $cm^{-1}$) | Quantum yield (%) |
|---|---|---|---|---|
| eCFP | 434 | 477 | 32,500 | 40 |
| eGFP | 489 | 509 | 55,000 | 60 |
| eYFP | 514 | 527 | 84,000 | 61 |
| mKate2 | 588 | 633 | 62,500 | 40 |

TABLE 1-2

Food colorings approved by the U.S. Food and Drug Administration

| FD&C Designation[a] | Name | Color | Excitation/Emission wavelengths[16] | Molecular Formula |
|---|---|---|---|---|
| Blue No. 1 | Brilliant Blue FCF | Blue | 580-600 nm/650-700 nm | $C_{37}H_{34}N_2Na_2O_9S_3$ |
| Green No. 3 | Fast Green FCF | Turquoise | 580-600 nm/650-700 nm | $C_{37}H_{34}N_2Na_2O_{10}S_3$ |
| Red No. 3 | Erythrosine | Pink | 500-540 nm/570-680 nm | $C_{20}H_6I_4Na_2O_5$ |
| Red No. 40 | Allura Red AC | Red | 450-540 nm/540-610 nm | $C_{18}H_{14}N_2Na_2O_8S_2$ |
| Yellow No. 5 | Tartrazine | Yellow | 450-540 nm/540-610 nm | $C_{16}H_9N_4Na_3O_9S_2$ |
| Yellow No. 6 | Sunset Yellow FCF | Orange | 450-540 nm/540-610 nm | $C_{16}H_{10}N_2Na_2O_7S_2$ |

[a]FD&C stands for laws passed by the U.S. Congress in 1938, called the Federal Food, Drug, and Cosmetic Act.

According to an alternative embodiment, edible fluorescent dyes can be used to produce luminescent silk microparticles. Fortunately, several FDA-approved food coloring dyes have strong fluorescent properties similar to fluorescent proteins, as summarized in Table 1-2.

Figure 2A:
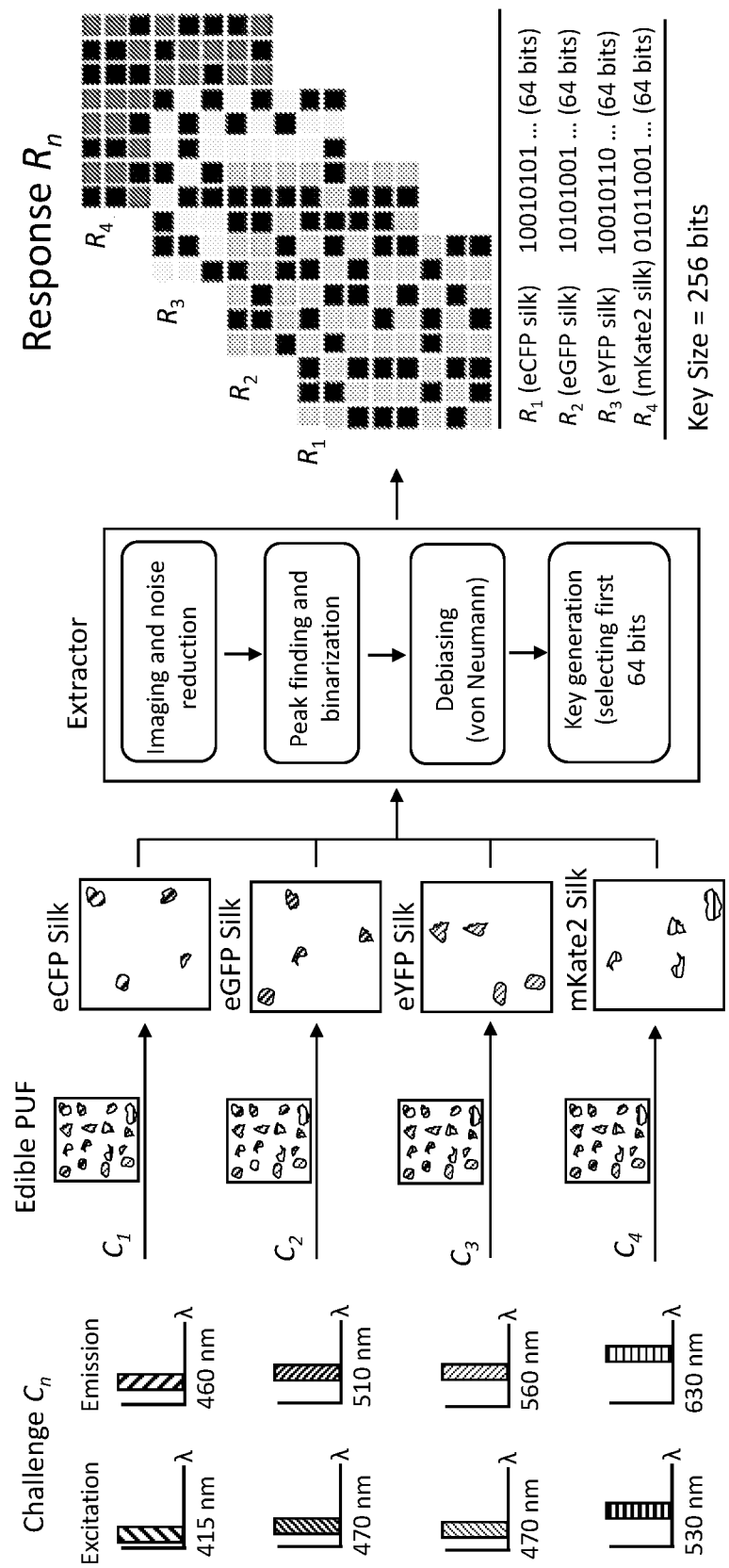
FIG. 2a is a flow diagram that illustrates how a cryptographic key is extracted from an output response of a PUF according to the present disclosure when optically challenged, including the raw output measurement, the bitstream extraction, and the final digitized security key.
Figure 2B:
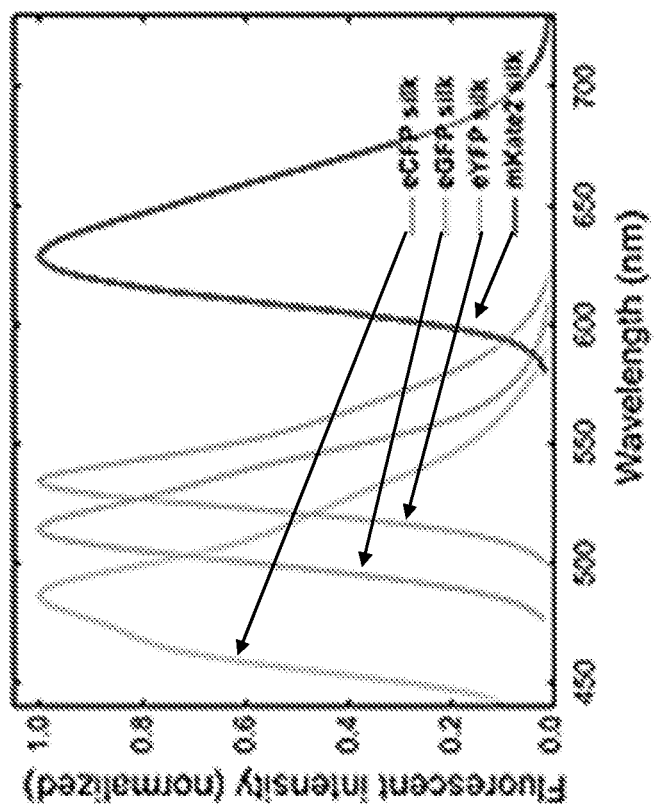
FIG. 2b provides graphs of normalized absorption and normalized intensity vs. wavelength in nm.
Figure 2B:
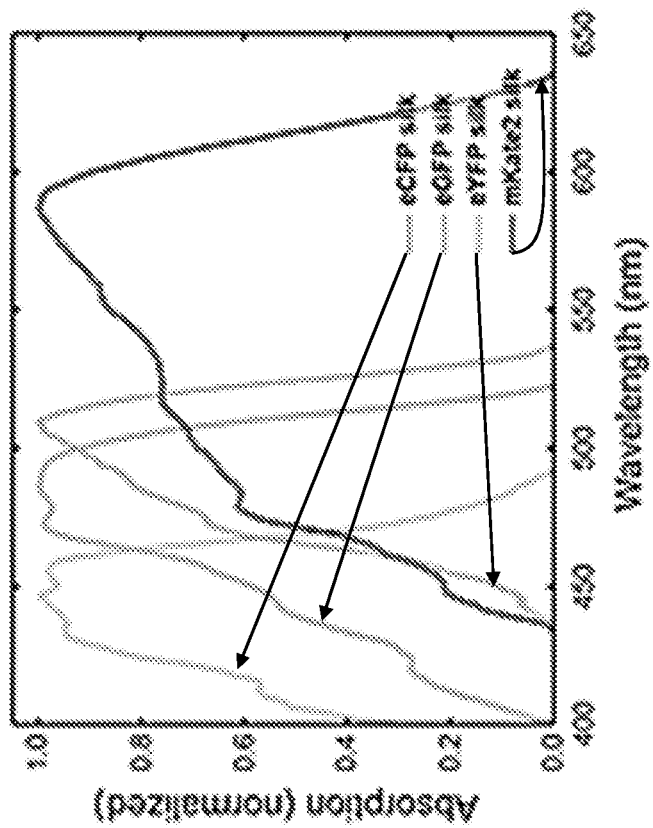
Figure 2C:
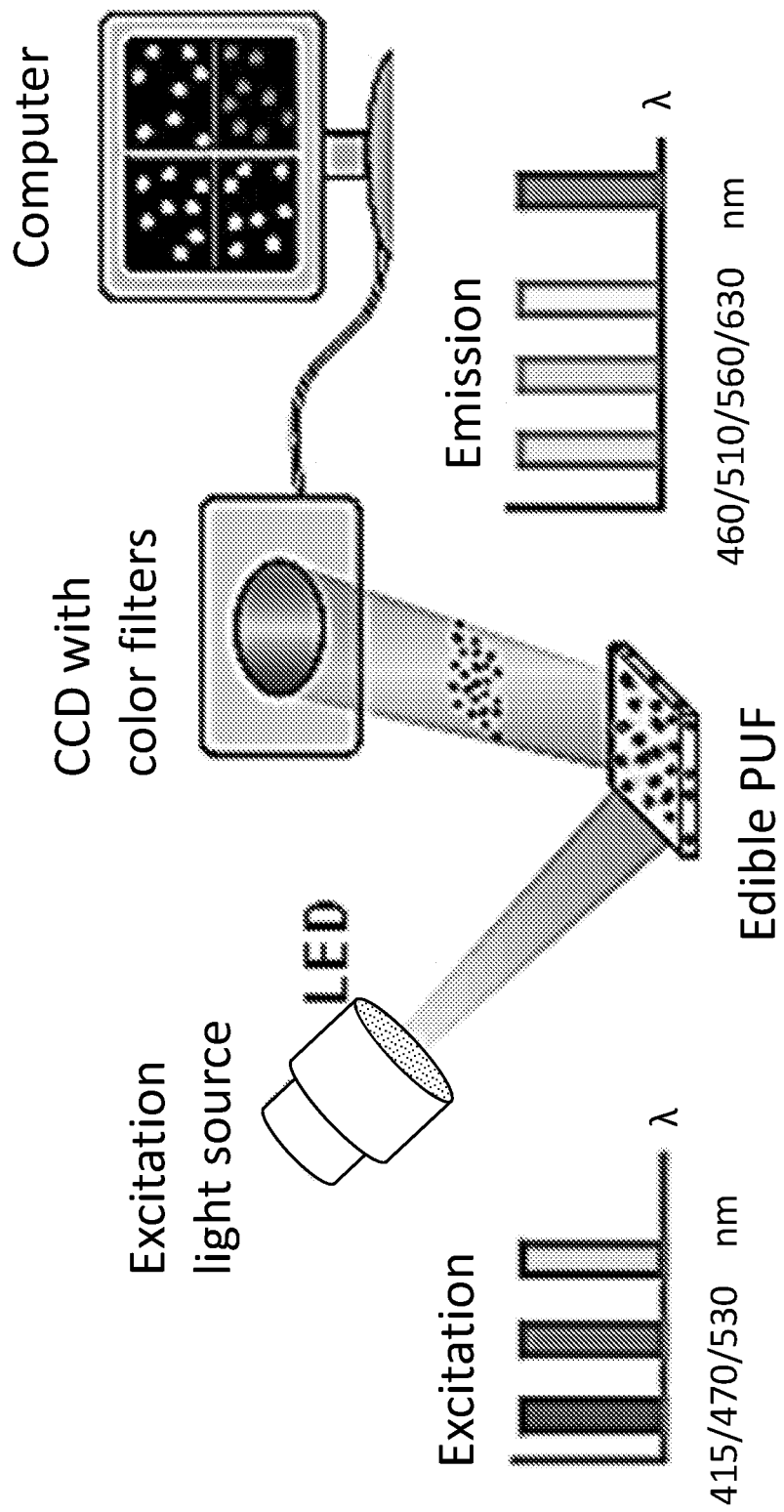
FIG. 2c is a schematic of an optical excitation scheme according to the present disclosure in which a raw fluorescent image is recorded by a charge-coupled device (CCD) camera equipped with a conventional zoom lens via a tunable color filter.
Figures 3A, 3B, 3C:
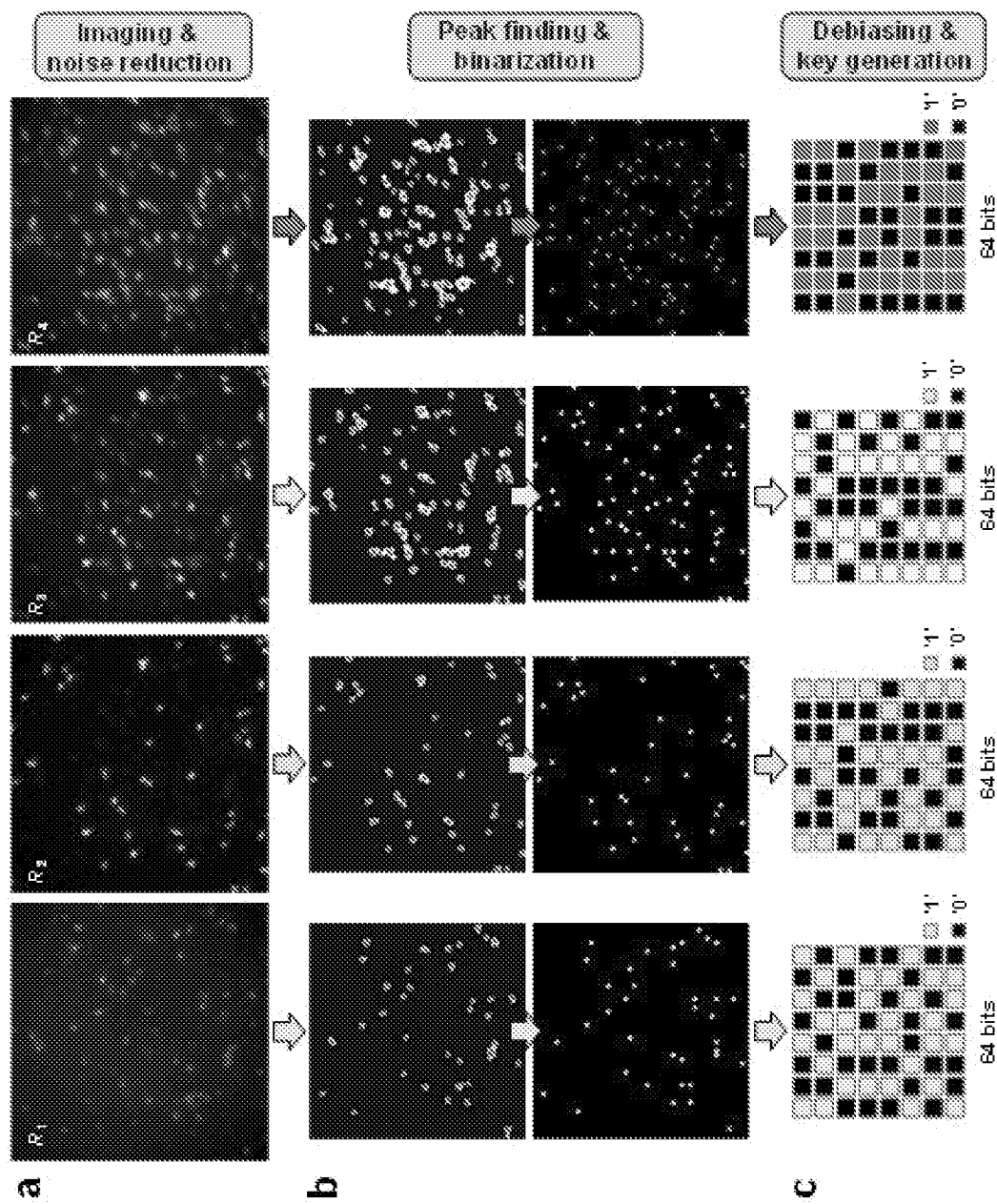
FIGS. 3a, 3b and 3c are photographs from the reading apparatus which acquires raw fluorescent images of an edible PUF device in which an admixture of eCFP, eGFP, eYFP, and mKate2 silk microparticles is embedded in a thin silk film (300 pixels×300 pixels), as shown in FIG. 3a; the peak finding and binarization processes provide high stability and reproducibility in key generation, reducing the number of pixels to 50 pixels×50 pixels, as shown in FIG. 3b, and the von Neumann debiasing process allows to compress dominant '0'-bits resulting from the relatively small number of peaks, as shown in FIG. 3c.

Referring to FIG. 2a, a flow diagram is presented that illustrates how a cryptographic key is extracted from an output response of a PUF according to the present disclosure when optically challenged, including the raw output measurement, the bitstream extraction, and the final digitized security key. We mainly use four representative challenge-response pairs (n=4) based on the excitation and emission peak wavelengths of the individual fluorescent proteins in silk as provided in Table 1-1, above and FIG. 2b, in which graphs of normalized absorption and normalized intensity are depicted; however a higher or lower number of challenge-response pairs can be used. In FIG. 2a, an input challenge ($C_n$, where in this case n=1, 2, . . . 4) is selected as a combination of the excitation and emission bands at specific wavelengths such as $\lambda_{ex}$=415 nm and $\lambda_{em}$=460 nm; $\lambda_{ex}$=470 and $\lambda_{em}$=510 nm; $\lambda_{ex}$=470 and $\lambda_{em}$=560 nm; $\lambda_{ex}$=530 and $\lambda_{em}$=630 nm, corresponding to eCFP, eGFP, eYFP, and mKate2 in silk, respectively. Upon optical excitation, a raw fluorescent image is recorded by a charge-coupled device (CCD) camera equipped with a conventional zoom lens via a tunable color filter, a schematic of which is shown in FIG. 2c. An output response ($R_n$) is obtained by an extractor that converts the fluorescent image of silk microparticles to a binary bitmap, as shown in FIGS. 3a, 3b and 3c which are photographs of the reading apparatus which acquires raw fluorescent images of an edible PUF device in which an admixture of eCFP, eGFP, eYFP, and mKate2 silk microparticles is embedded in a thin silk film (300 pixels×300 pixels), as shown in FIG. 3a; the peak finding and binarization processes provide high stability and reproducibility in key generation, reducing the number of pixels to 50 pixels×50 pixels, as shown in FIG. 3b, and the von Neumann debiasing process allows to compress dominant '0'-bits resulting from the relatively small number of peaks, as shown in FIG. 3c. In simple von Neumann debiasing, the rate of compression is too high such that the raw data size needs to be much larger than an extracted size. In the extractor according to the present disclosure, the two-pass tuple-output von Neumann debiasing algorithm maintains a practical data size. After von Neumann debiasing, first 64 bits in each output response are selected to create a total of 256-bit security key. From a methodology perspective, to improve the quality of binarization, we normalize the raw fluorescent image (300 pixels×300 pixels) by the maximum intensity, as shown in FIG. 3a. The noise is removed by applying a threshold of 20%. Fluorescent areas smaller than a specific pixel size of 20 are also considered as noise. Then, the image is resized to be 50 pixels×50 pixels with a binning process. Next, to ensure a low bit error rate (high reproducibility), we find the spatial peak position of each fluorescent silk microparticle where the highest intensity peaks of the microparticles are located, as shown in FIG. 3b. Then, the peak positions are only assigned to '1' bits and other pixels are '0' bits. Third, to remove the bias of '0'-bits, we apply an enhanced version of the von Neumann bias compression algorithm with two-pass tuple-output debiasing, as shown in FIG. 3c. Because the fluorescent peaks are relatively rare events in the entire image due to the density of the fluorescent microparticles, global bias is present such that '0'-bits are generated consistently more often than '1'-bits. Finally, after debiasing, we use first 64 bits as an output response of a particular challenge, because a typical minimum number of peaks in the fluorescent images is 32. Combining four challenge-response pairs (n=4) together, the final digitized key size results in 256 bits (=4×64).

Figure 4:
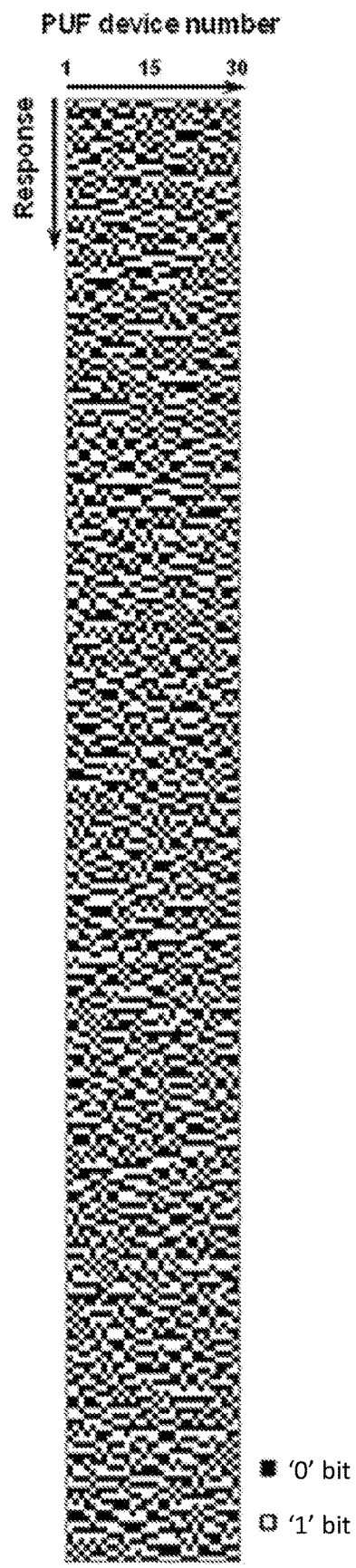
FIG. 4 is a binary map representation that shows randomness of binary sequences summed from 30 different PUFs.

We assess the quality of randomness of the edible PUF-generated binary sequences, using the NIST statistical test suite that was originally designed to evaluate random and pseudorandom number generators. When PUF responses are used for cryptographic key generation, it is critical to evaluate the randomness to ensure the unpredictability of the keys generated by PUFs. The NIST statistical test suite includes 15 different tests to quantify the randomness of bitstreams. Each test focuses on a specific aspect of randomness. Some of the tests rely on the minimum sequence length of 1×10⁶ and the minimum number of substrings (blocks) of 55, requiring a total stream of 5.5×10⁷ bits. On the other hand, the key size of the edible PUFs is significantly shorter than those of random number generators. To use seven statistical tests that require a reasonable stream length, we explore the randomness of binary sequences summed from 30 different PUFs. A binary bitmap representation is shown in FIG. 4. Notably, the bitstream from this binary bitmap is random, validated by the National Institute of Standards and Technology (NIST) randomness tests found in "A Statistical Test Suite for Random and Pseudorandom Number Generators for Cryptographic Applications" based on Table 1-1 and Table 3, below. Specifically, we collect a total of 7,680 bits from 30 different PUFs (256 bits for each PUF) and divide the bit stream into 60 sequences to perform each statistical 60 times on individual 128-bit long sequences. Each statistical test returns two results; a P-value and a pass rate (i.e. proportion), as shown in Table 2. As summarized in Table 2, the binary sequence from the 30 different PUFs passes all of seven NIST randomness tests without any post-processing. The parameter values used in each test and the characteristics of the NIST randomness tests are summarized in Table 3. In other words, the bitstream (7,680 bits) extracted from the 30 PUFs is statistically random, supporting the idea that the output responses of all protein-based PUFs can be unpredictable and unclonable. This result also supports the idea that our broadcasting process of particulate fluorescent silk offers a random spatial distribution as a straightforward yet effective entropy source.

TABLE 2

Summary of the randomness tests of binary sequences generated from edible PUFs, using the NIST statistical test suite.

| NIST statistical test | P-value | Proportion | Result |
|---|---|---|---|
| Frequency | 0.035174 | 60/60 | Pass |
| Block frequency | 0.031497 | 60/60 | Pass |
| Cumulative sums | 0.006990, 0.020085 | 60/60, 60/60 | Pass |
| Runs | 0.014216 | 59/60 | Pass |
| Longest run of ones | 0.324180 | 60/60 | Pass |
| Approximate entropy | 0.275709 | 60/60 | Pass |
| Serial | 0.232760, 0.468595 | 60/60, 60/60 | Pass |

Figures 5A, 5B:
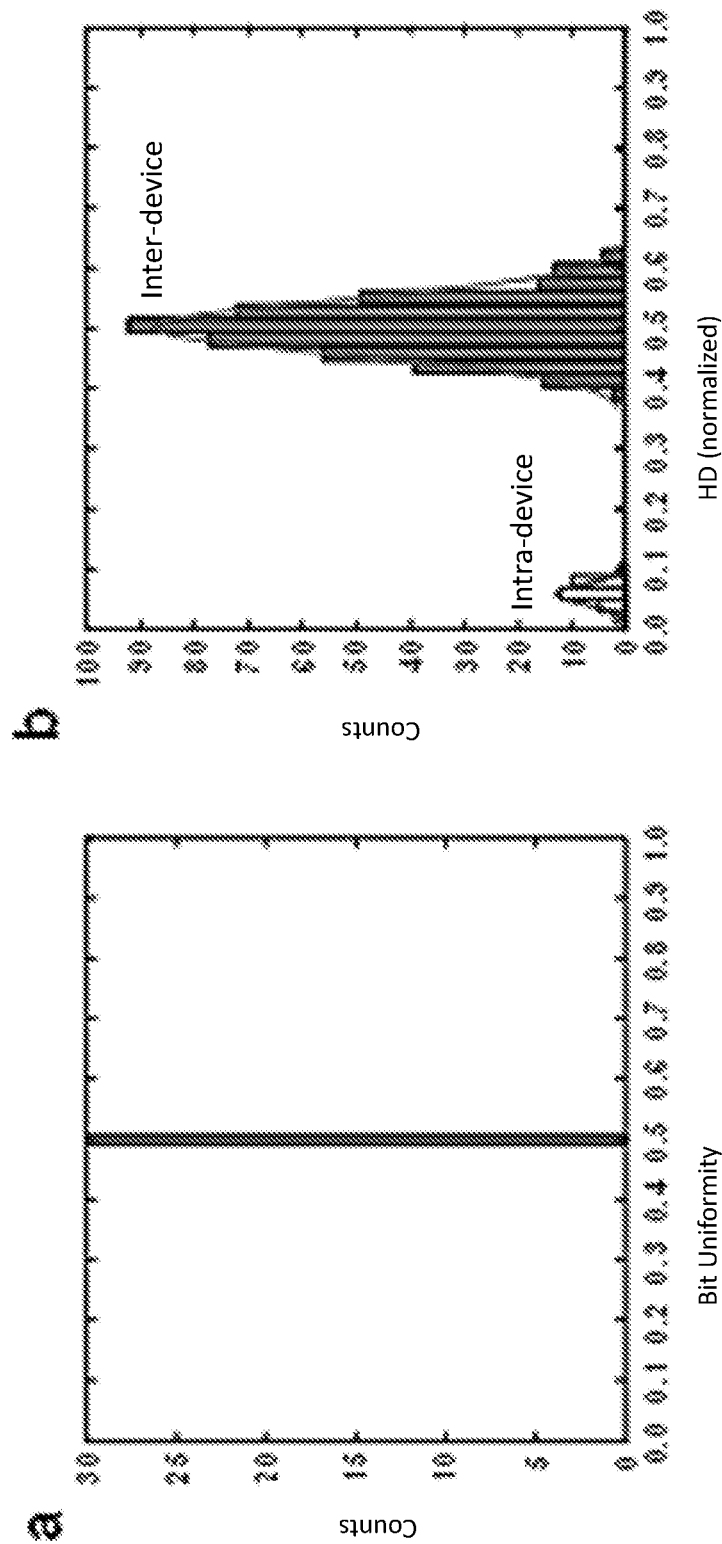
FIG. 5a is a histogram of bit uniformity.
FIG. 5b is a histogram of the normalized inter-device Hamming Distances (HDs).

To evaluate the PUF performance, we evaluate whether the output responses of the edible PUFs are uniform as well as unique. We first estimate the bit uniformity by checking the equal probability of observing '1'- or '0'-bit states as provided by equation 1, below:

$$\text{Bit uniformity} = \frac{1}{s}\sum_{l=1}^{s} R_l \qquad (1)$$

where $R_l$ is the $l^{th}$ binary bit of the response; and s is the key size. The bit uniformity is the Hamming Weight (i.e. number of '1' bits in a binary sequence) of the s-bit response, as known to a person having ordinary skill in the art. For 30 different PUFs, the distribution of bit uniformity converges to the ideal value of 0.5, as shown in FIG. 5a, which is a histogram of bit uniformity. Then, to evaluate the uniqueness of each PUF, we calculate an inter-device Hamming Distance (HD) by counting a number of different bits between two PUFs under the same challenge. The uniqueness measures the degree of correlation between responses measured from two different PUFs. Ideally, the responses from any two selected PUF devices should be uncorrelated, indicating that the state of a PUF is unknown even when the states of other PUFs are known. The inter-device HD between any two PUF devices can be defined by equation 2:

$$\text{Uniqueness} = \frac{2}{k(k-1)}\sum_{i=1}^{k-1}\sum_{j=i+1}^{k}\frac{HD(R_i, R_j)}{s} \qquad (2)$$

where $R_i$ and $R_j$ are s-bit responses of the $i^{th}$ PUF device and the $j^{th}$ PUF device among k different PUFs, respectively. The 30 different PUF devices generate a total of $_{30}C_2$ (=30×29/2=435) comparisons. Referring to FIG. 5b, a histogram of the normalized inter-device HDs is shown which is well fitted into a Gaussian

TABLE 3

Brief characteristic descriptions of the NIST statistical tests performed in our work.

Figures 5C, 5D:
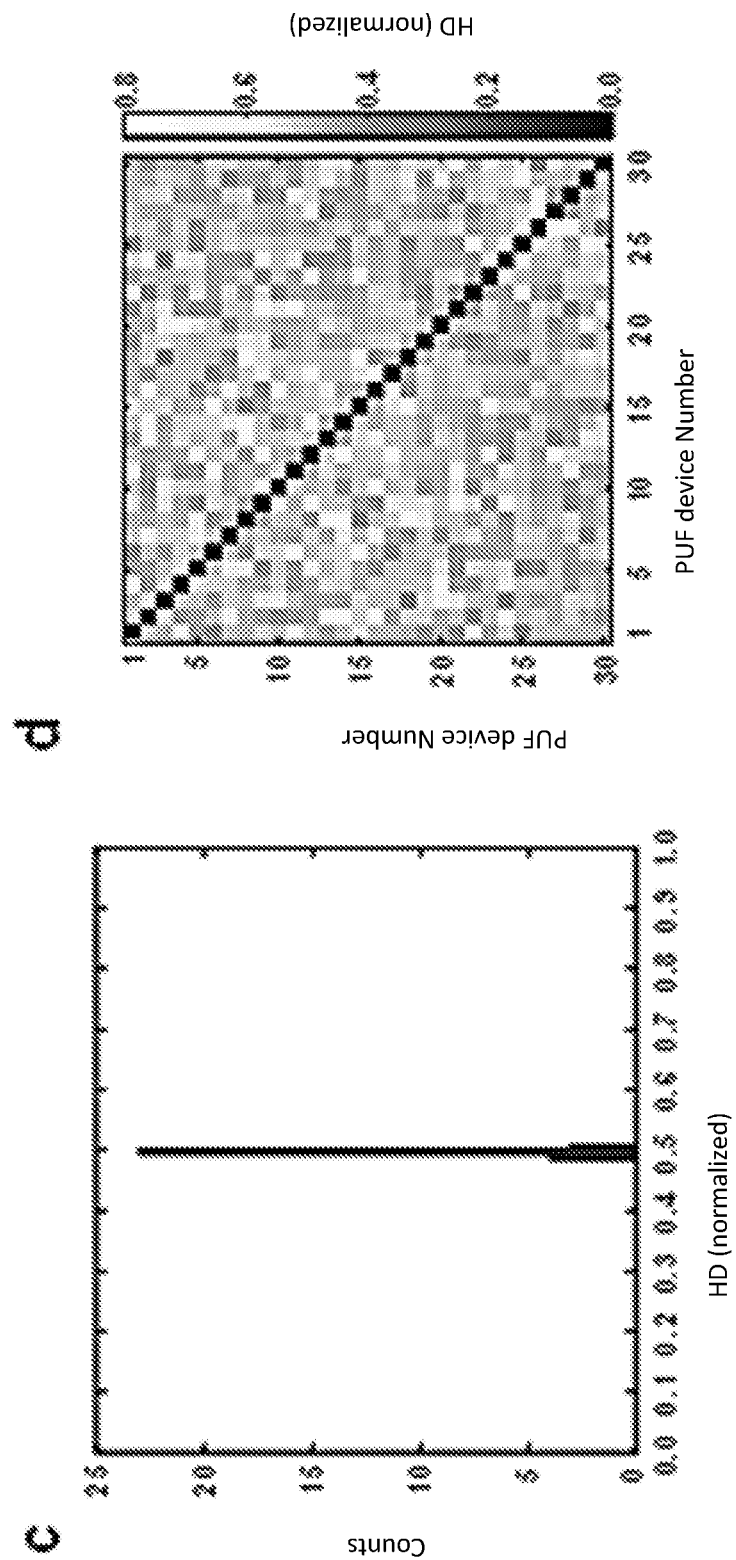
FIG. 5c is a histogram of a normalized HD.
FIG. 5d is a pairwise comparisons among 30 different edible PUFs.
Figure 6:
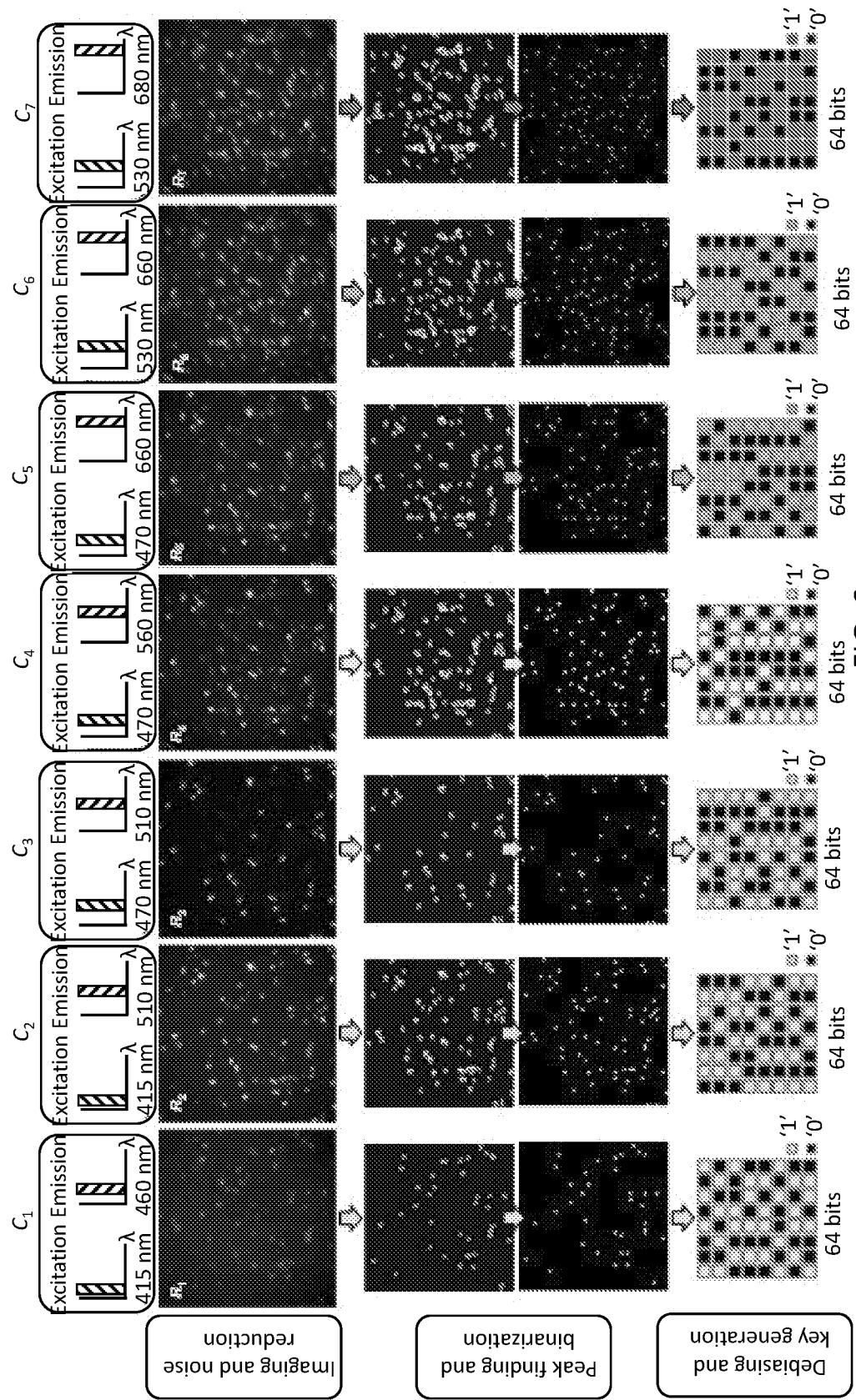
FIG. 6 provides photographs of an extended number of challenge-response pairs for a stronger PUF.
Figure 7:
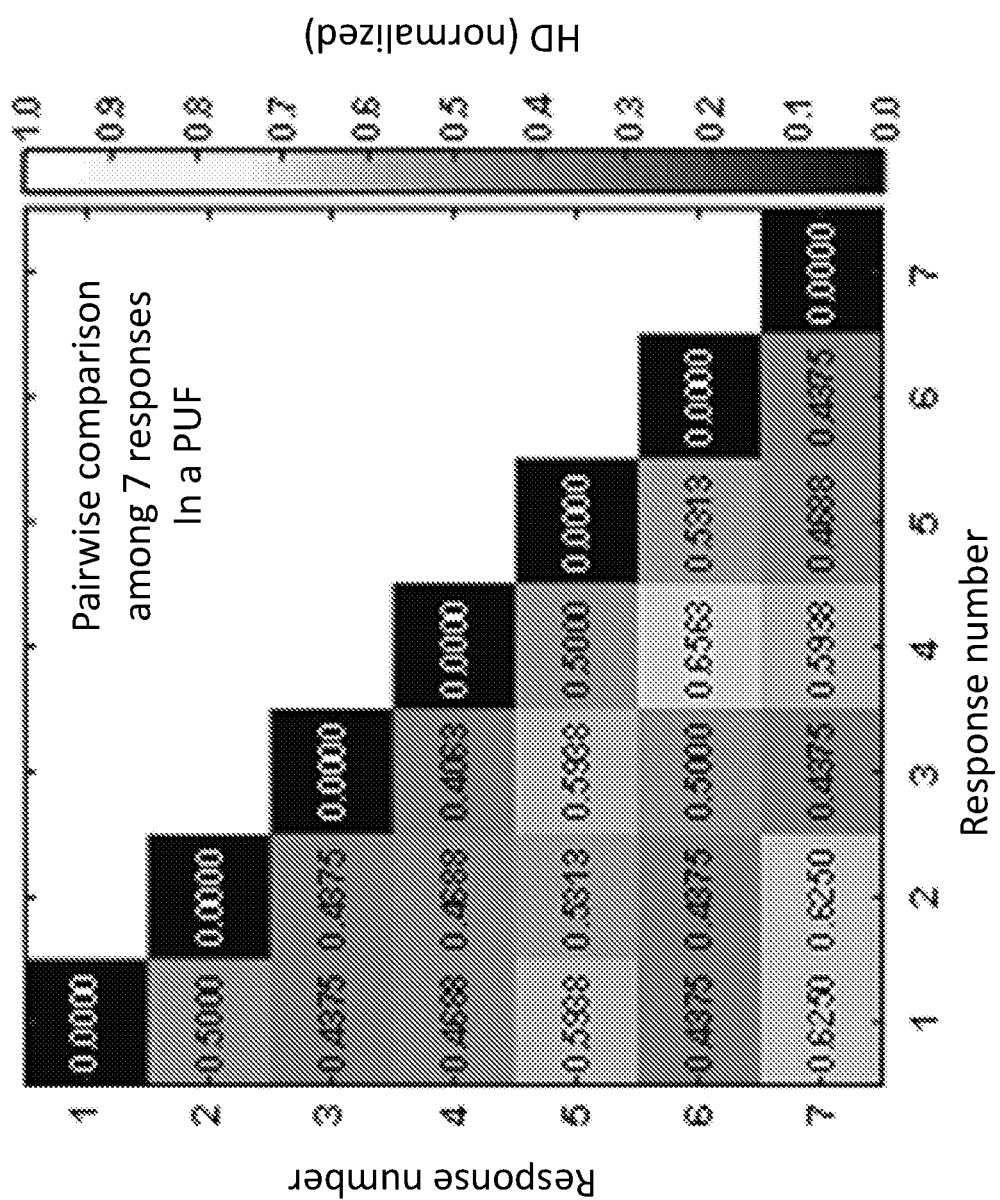
FIG. 7 is a graph of pairwise comparisons among seven different responses in one single PUF.

| Test name | n | M or m | # of subtests | Defect detected |
|---|---|---|---|---|
| Frequency | 128 | — | 1 | Proportion of '0's and '1's for the entire sequence, assessing the closeness to 1/2. |
| Block frequency | 128 | 20 | 1 | Proportion of '0's and '1's within m-bit blocks (m is the length in bits of each block). |
| Cumulative sums | 128 | — | 2 | Maximal excursion of a random walk, determining the cumulative sum of the partial sequences. |
| Runs | 128 | — | 1 | Number of runs (uninterrupted sequence of identical bits) and the relative oscillation, using the number of runs of '0's and '1's of various lengths. |
| Longest run of ones | 128 | 8 | 1 | Length of the longest run of '1's within the tested sequence, compared with that from a random sequence. |
| Approximate entropy | 128 | 2 | 1 | Frequency of overlapping patterns across the entire sequence, using the frequency of overlapping blocks of two consecutive/adjacent lengths. Similar to serial test. |
| Serial | 128 | 4 | 2 | Frequency of overlapping patterns across the entire sequence, checking the number of occurrences of the $2^m$ m-bit overlapping patterns. Similar to approximate entropy. | distribution with a center at 0.5032 with a standard deviation (SD) of 0.0458, which is close to its ideal value of 0.5, supporting the excellent uniqueness of all of the edible PUFs. In addition, we investigate the degree of correlation among four responses in each PUF by calculating an average HD, as shown in FIG. 5c, which is a histogram of a normalized HD. The 30 different PUFs result in a mean HD value of 0.499 with a SD of 0.0041, indicating that the individual responses in each PUF is also unique. FIG. 5d is a pairwise comparisons among 30 different edible PUFs. The HDs in the off-diagonal areas fluctuate near the mean value of 0.5032. When the number of challenge-response pairs is extended to seven, seven output responses are still uncorrelated with a mean HD value of 0.5089 with a SD of 0.0766. Referring to FIG. 6 photographs of an extended number of challenge-response pairs for a stronger PUF are shown. The extractor includes the same elements of noise reduction, peak position finding, binarization, and debiasing. Seven responses create a total of 448-bit security key with an enhanced nominal encoding capacity of $2^{448}$ (=7.2684×10$^{134}$). Referring to FIG. 7, a graph of pairwise comparisons among seven different responses in one single PUF is shown. A mean of HDs in the off-diagonal areas is 0.5089 with a SD of 0.0766, supporting minimum correlations among different responses. In other words, each output response is unique and distinct.

In addition, we calculate a conservative encoding capacity of the edible PUF-generated binary sequences by taking the mutual independency among bits into account. In FIG. 5b, the resultant width of the inter-device distribution shows that significant subsets of the key are mutually independent, corresponding to the degree of freedom (or number of independent variables) of 120 ($\approx$0.5032×(1−0.5032)/0.0458$^2$), based on the central limit theorem. The resultant digitized key size generated from the edible PUF has a relatively strong encoding capacity. An encoding capacity is defined as $c^t$ where c is the bit-level (e.g. c=2 for binary bits of '0' and '1') and t is the key size with mutual independence. The edible PUF has c=2 and t=120, resulting in an encoding capacity of $2^{120}$ ($\approx$1.3292×10$^{36}$). Importantly, the debiasing process is useful not to comprise the actual coding capacity. If a security key is biased with too many '0's or '1's, the actual coding capability is often diminished. A strong encoding capacity could be utilized to provide information on manufacturer-determined data, including dose information (e.g. dosage strength, dose frequency, and expiration date), manufacturing details (e.g. location, date, batch, and lot number), and distribution path (e.g. country, distributor, wholesaler, and chain). If a higher encoding capacity is required for a specific application, the key size can simply be scaled by further optimizing the density of fluorescent silk microparticles, which allows for a larger number of peaks in each image. The number of challenge-response pairs can also be increased by incorporating additional combinations of the excitation and emission bands, as shown in FIG. 6.

Figures 8A, 8B:
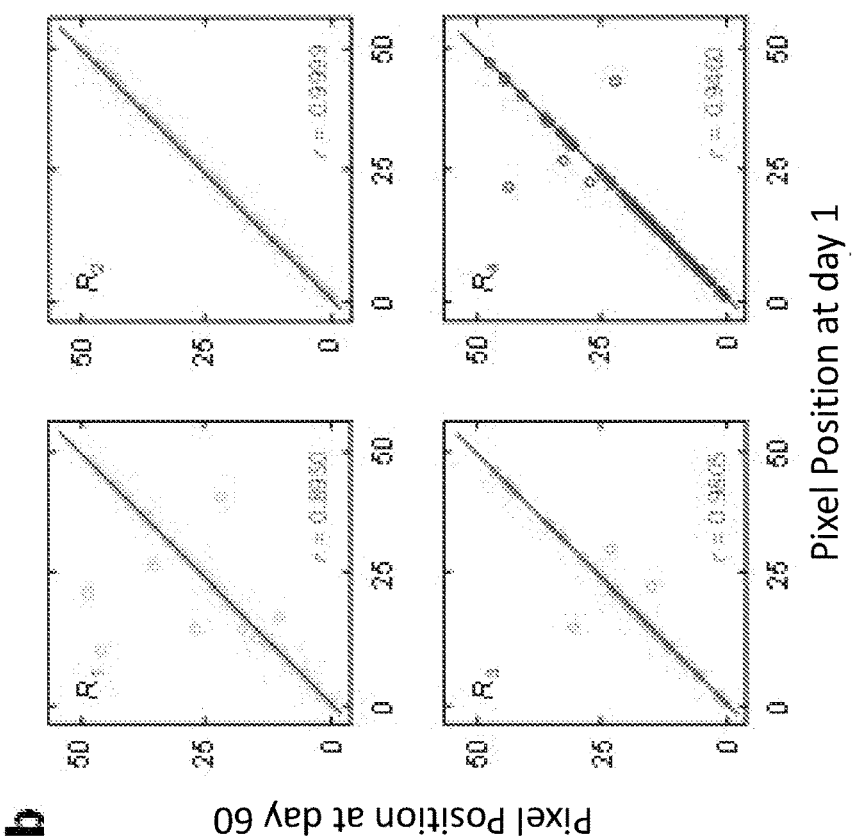
FIGS. 8a and 8b are scatterplots of the fluorescent intensity of four responses acquired 60 days apart using the same corresponding challenges (FIG. 8a) and scatterplots of pixel positions (first 32 peaks in the binarized images) of four responses acquired 60 days apart using the same corresponding challenges (FIG. 8b).
Figure 9:
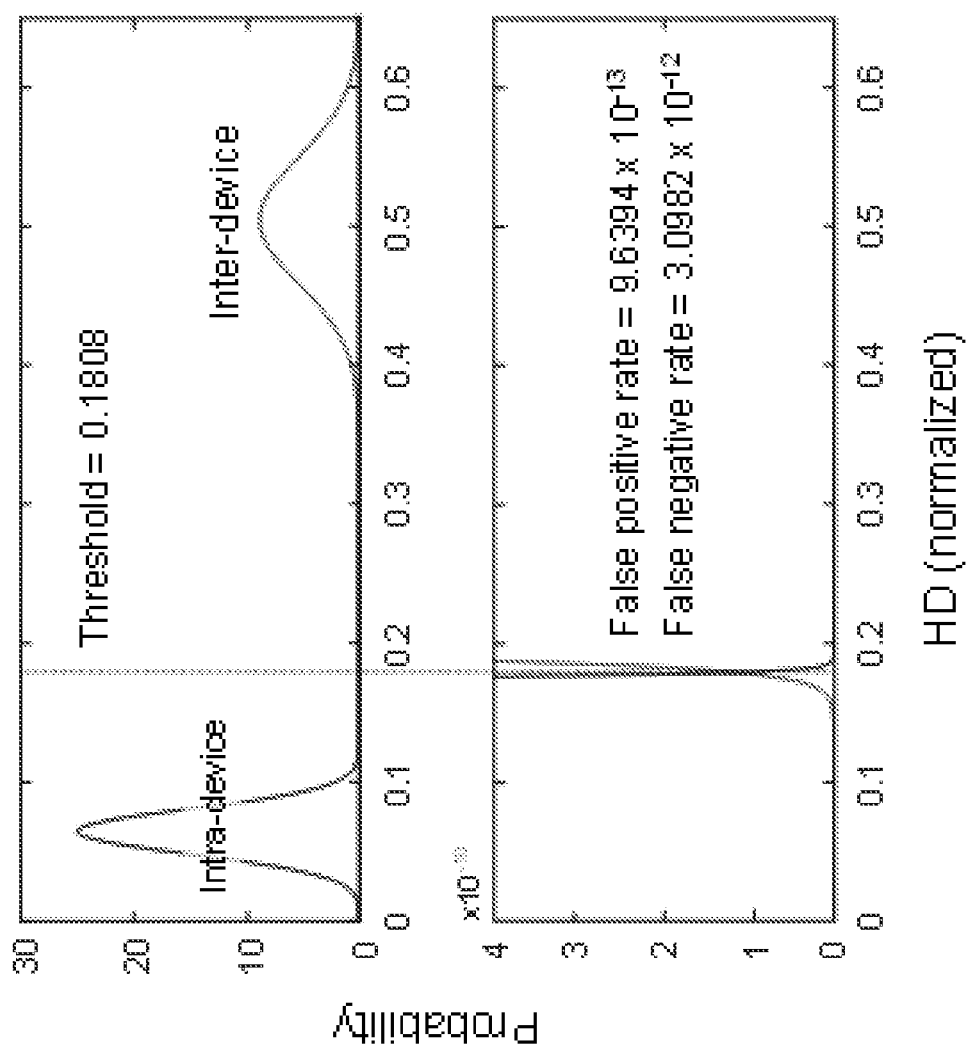
FIG. 9 provides probability graphs for intra-device (reproducibility) and inter-device (uniqueness) variabilities with a cut-off threshold of 0.1808.

To examine the feasibility for reliable PUFs, the reproducibility and stability of the responses from the identical PUF device were tested. The reproducibility of a PUF represents the ability of generating the identical responses following the same repeated challenge. We calculate an intra-device HD, which is quantitatively described by a bit error rate (i.e. percentage of error bits out of response bits with an ideal value of 0) from 10 challenge-response cycles (nine pairwise comparisons) for each PUF device. For the i$^{th}$ PUF device, an average intra-device HD captures the reproducibility:

$$\text{Reproducibility} = \frac{1}{m}\sum_{t=1}^{m} \frac{HD(R_i, R_{i,t})}{s} \qquad (3)$$

where $R_i$ and $R_{i,t}$ are the original s-bit reference response and a s-bit response extracted from the same PUF device at a different time-point t and m is the number of repeated measurements. Referring back to FIG. 5b, a relatively low mean value of 0.0632 with a SD of 0.0164 estimated is shown from the intra-device HD histogram for the 30 different PUFs at the same 10 challenge cycles. We further examine the long-term reliability under the same challenges after 60 days in the laboratory environment (i.e. stored at 22±2° C. and 40-50% relative humidity in the dark), as shown in FIGS. 8a and 8b which are scatterplots of the fluorescent intensity of four responses acquired 60 days apart using the same corresponding challenges (FIG. 8a) and scatterplots of pixel positions (first 32 peaks in the binarized images) of four responses acquired 60 days apart using the same corresponding challenges (FIG. 8b). r shown in each of the panels in FIGS. 8a and 8b is the correlation coefficient. The highly linear relationships support the long-term reliability and stability of the edible PUFs. When the fluorescent intensity of the raw fluorescent images taken 60 days apart is compared, the correlation coefficients (r) of the four responses range from 0.833 to 0.983. For the pixel positions of the first 32 peaks in the binarized images, the r values are even higher than 0.895 for all of the responses. These results support the potential reliability of the protein-based edible PUFs, although the reproducibility assessments do not reflect extremely harsh conditions, given the medical applications. We further estimate a false positive rate and a false negative rate from the inter-device and intra-device variabilities. When PUFs are used for authentication, the false positive rate is the probability that PUF A is authenticated as PUF B. The false negative rate is the probability that a correct PUF fails to be authenticated. The resulting false positive and false negative rates are 9.6394×10$^{-13}$ and 3.0982×10$^{-12}$, respectively, assuming that the inter-device and intra-device variabilities follow Gaussian distributions shown in FIG. 9 which show probability graphs for intra-device (reproducibility) and inter-device (uniqueness) variabilities with a cut-off threshold of 0.1808. The resulting false positive and false negative rates are 9.6394×10$^{-13}$ and 3.0982×10$^{-12}$, respectively. The pairwise comparison map of cross-HD analyses further shows that all of the 30 different PUFs are highly uncorrelated, as seen in FIG. 5d where the diagonal line indicates the intra-HD values for the identical PUF device itself, while the off-diagonal points represent the inter-HD values compared with the other PUF devices.

Figure 10:
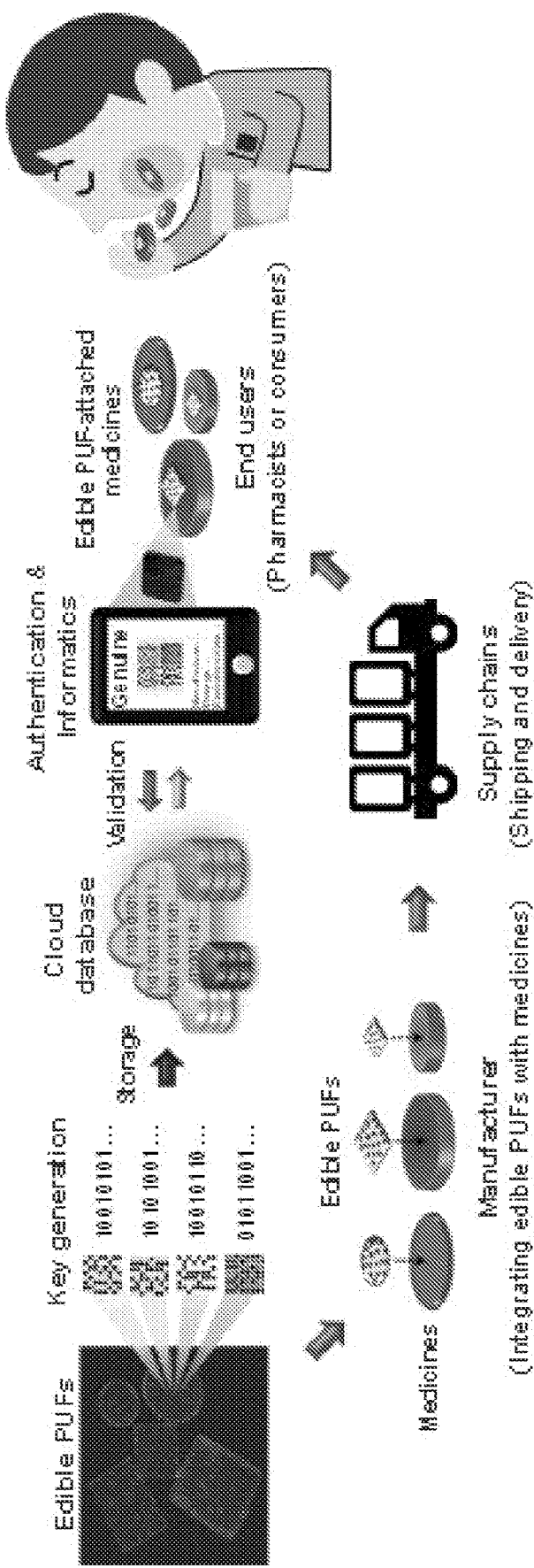
FIG. 10 is a schematic of a concept of on-dose authentication, where each individual medicine in a solid oral dosage form (e.g. tablets and capsules) is integrated with an edible PUF device by the pharmaceutical manufacturer.
Figure 11:
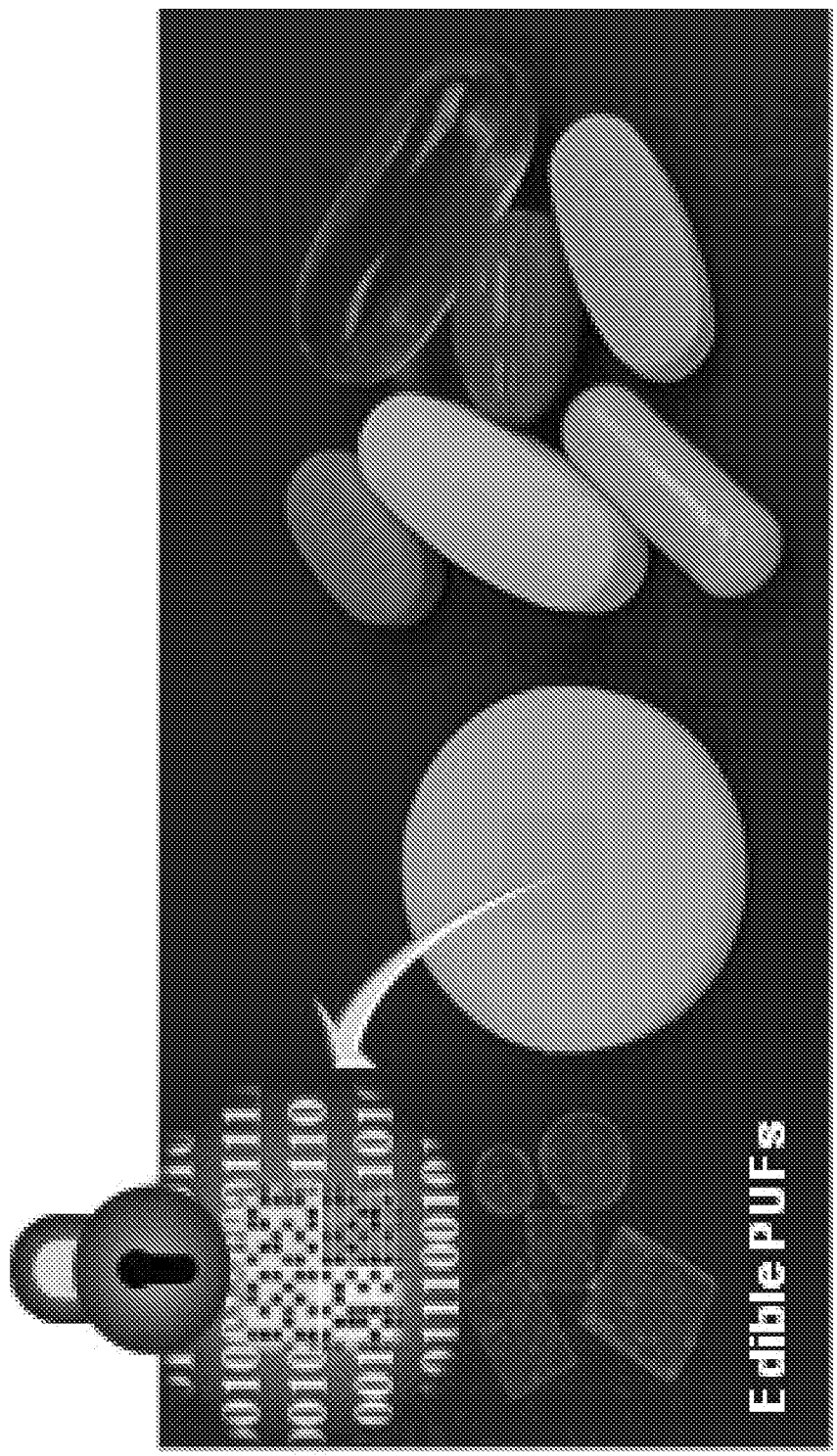
FIG. 11 is a schematic showing feasibility of on-dose (or in-dose) authentication using edible PUFs.

According to one embodiment, one application of the reported edible PUFs is on-dose authentication to prevent patients from taking counterfeit pharmaceutical products, as shown in FIGS. 10 and 11. FIG. 10 is a schematic of a concept of on-dose authentication. Each individual medicine in a solid oral dosage form (e.g. tablets and capsules) is integrated with an edible PUF device by the pharmaceutical manufacturer. End users (e.g. pharmacists and consumers) can ensure the provenance and validate the medicine. In addition, this edible PUF could be utilized to provide dose information and manufacturer-determined data, including product information (e.g. dosage strength, dose frequency, and expiration date), manufacturing details (e.g. location, date, batch, and lot number), and distribution path (e.g. country, distributor, wholesaler, and chain). FIG. 11 is a schematic showing feasibility of on-dose (or in-dose) authentication using edible PUFs. The edible PUF, which can be flexible, can be attached to the surface of medicines in a solid oral dosage form including pills, tablets, and capsules. Each medicine possesses unique challenge-response pairs and the end user can verify genuine or fake using a smartphone camera or a customized reader and accessing the registered digital keys in a database (e.g. cloud) where each validation is guided with a trusted authority against the digital identity. Indeed, the edible PUF has a self-vanishing feature. Silk proteins (i.e. fibroin) are easily dissolved in an aqueous solution without any special treatments, owing to the disintegration property and proteolytic activity (i.e. enzymatic degradation). When the reported edible PUF is loaded with a blue dye (i.e. methylene blue) for easy visual detection purpose, it is completely dissolved in deionized water after 240 minutes, also supporting the use for oral consumption. In other words, the end user (i.e. patient) can take the medicine without removing the PUF from the surface.

It should be appreciated that according to the present disclosure, particles are applied either i) to a substrate or ii) to a pharmaceutical directly. The substrate can be made of an edible silk or an edible polymer, further described above and in the sister application described in the RELATED APPLICATIONS section of the instant application. The particles can be one or more of edible silk (e.g., edible fluorescent silk), edible dyes (e.g., edible fluorescent dyes), edible polymers, further described above and in the sister application. These particles can be cast into a random pattern onto either the substrate, or the pharmaceutical directly. Alternatively, these particles can be sprayed onto either the substrate, or the pharmaceutical directly in order to generate a random pattern. Once the particles are applied, an image can be obtained from these particles and a cryptographic key generated representing an original authentication pattern. This cryptographic key is then stored in a secured database awaiting authentication by an end user. The image can be obtained by the end user of the pharmaceutical by a single image capture device representing an X-Y cryptographic pattern (i.e., a two-dimensional image) or by more than one image capture device (e.g., stereo-photography) representing an X-Y-Z cryptographic pattern (i.e., a three-dimensional image for a pharmaceutical with curvatures in the Z-direction). The cryptographic pattern is a map of particles found on the substrate or the pharmaceutical directly. For example, a "1" represents presence of particle while a "0" represents absence of a particle. In order to enhance the cryptography, in addition to grayscale edible particles, fluorescent particles can be used which require stimuli by various bands of light. Such wavelength bands can be generated by applying filters to both source of light, e.g., a flash from a mobile device, and/or the image capture device, e.g., a camera or cameras of the mobile device. Therefore, in addition to generating X-Y vs. X-Y-Z images, the approach of the present disclosure can discriminate between different wavelengths of light (i.e., fluorescence).

Figure 12A:
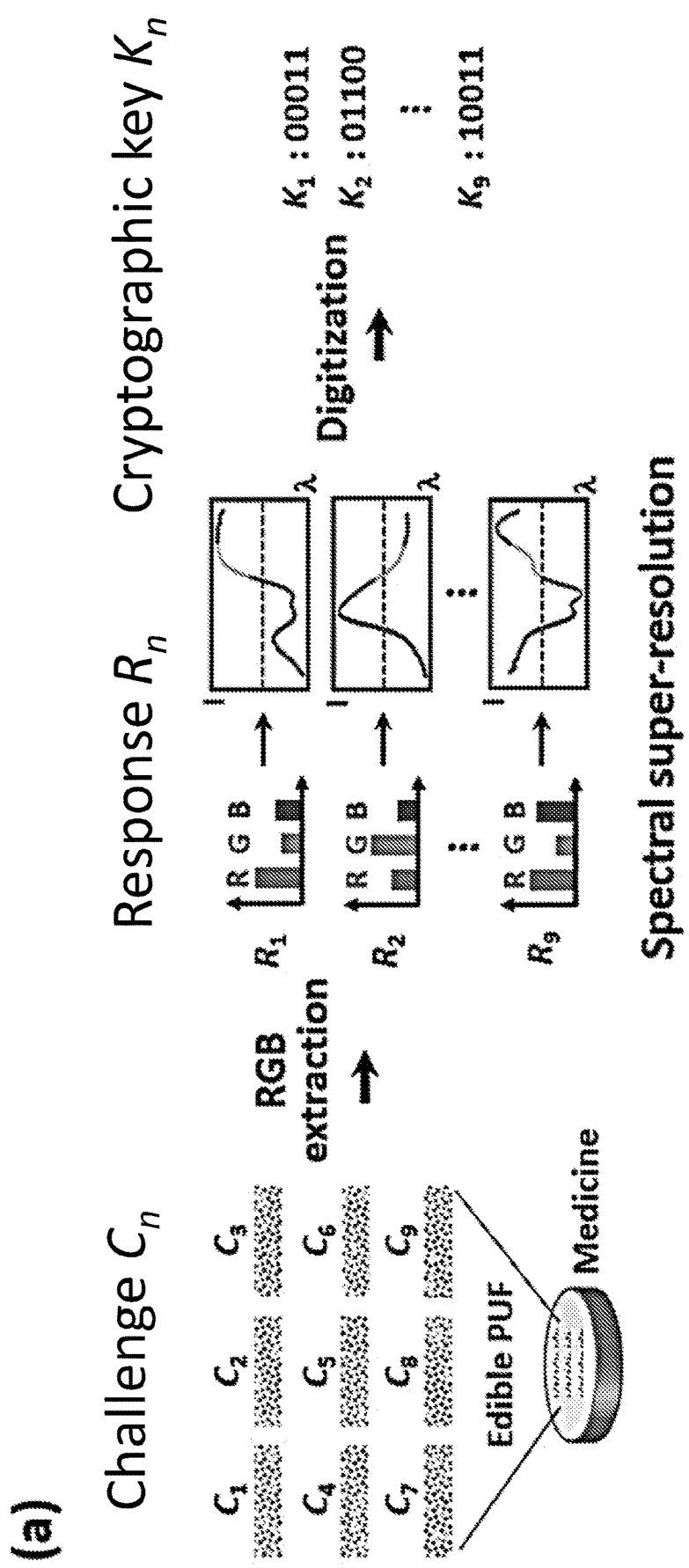
FIG. 12a is a schematic of another challenge-response system based on colored PUFs which is configured to provide a cryptographic key for comparison with a counterpart specific key at a remote database.
Figure 12B:
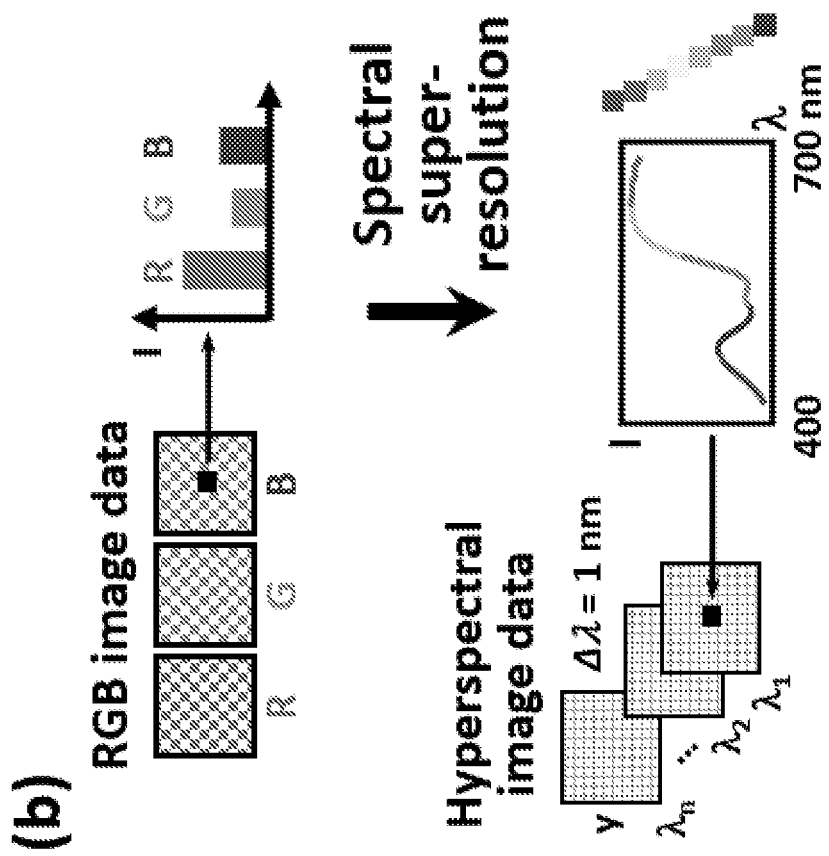
FIG. 12b is a schematic of an embodiment of FIG. 12a which includes silk microparticles colored with FDA-approved food coloring dyes constituting a color-based PUF technology that can easily be detected by the built-in camera of a smartphone.

In addition to the fluorescent-based PUF, the present disclosure also provides a color-based approach for decrypting PUFs as an anti-counterfeiting technology for on-dose authentication for patients. Towards this end, an advanced anti-counterfeit technology that makes on-dose authentication scalable, cost-effective, and user-friendly with additive manufacturing and efficient data acquisition approaches is further described herein. A dataset from many samples serves as a population to an extent. Each camera model has different RGB spectral responsivities. Exact colors in photographs vary from camera to camera. After the RGB spectral responsivities are measured, the hyperspectral matrix can convert the subject-specific RGB image dataset to a subject-specific hyperspectral dataset. This will allow us to have universal color information without depending on camera models. As illustrated in FIG. 12*a* (which is a schematic of a challenge-response system configured to provide a cryptographic key for comparison with a counterpart specific key at a remote database), this on-dose authentication is based on a color-based PUF technology that can easily be authenticated with the camera of a smartphone. A color-based edible PUF on an object's surface, e.g., a pill or capsule, has multiple thin stripes and each stripe is composed of many colored silk microparticles. The source of entropy (disorder) is an unpredictable random spectral profile averaged from the colored microparticle admixture within each stripe. For the challenge-response requirement of PUFs, a stripe serves as an input challenge and its spectrum generates a genuinely inherent output response. An alternative embodiment includes silk microparticles colored with FDA-approved food coloring dyes constituting a color-based PUF technology that can easily be detected by the built-in camera of a smartphone. Referring to FIG. 12*b*, utilizing a spectral super-resolution methodology can virtually transforms the built-in camera of a smartphone into a hyperspectral imager for spectroscopic analyses of detailed color differences; spectral learning of spectral super-resolution enables mathematical reconstruction of reflectance spectra from RGB images. The importance of spectral super-resolution is twofold: i) to enhance the parameter space of PUF in the frequency domain to be more resistant to attempt to duplicate and ii) to implement a universal algorithm without being dependent on models of smartphones.

Thus, the method of the present disclosure advantageously uses spectral super-resolution to drastically enhance the parametric space of color-based PUF (FIG. 12*b*). With the notion that everything is hackable, any color-based security technologies lose the covertness and could potentially be less resistant to attempt to clone (e.g. scanning and printing the color patterns). To enhance the security level, it is necessary to incorporate a spectroscopic detection scheme to dramatically increase the parameter space of PUF in the wavelength (X) or frequency domain. This enhancement in the parameter space would be more resistant to attempt to replicate, making the PUF highly asymmetric. On the other hand, the spectroscopic detection has to rely on complex and costly optical instrumentation such as spectrometers, mechanical filter wheels, or tunable filters. Such dispersive optical components also result in significantly slow data acquisition, hampering practical translation. However, it is possible to mathematically reconstruct hyperspectral (with high spectral resolution) or multispectral (with several spectral measurements) data from RGB images taken by a conventional camera (i.e. 3-color sensors). Spectral super-resolution solves an ill-posed problem as an inverse mapping from a subsampled space (RGB colors) to a dense space (multiple wavelengths). In other words, original hyperspectral data in the visible range are mathematically reconstructed from an RGB image (i.e. 3-color information from R, G, and B channels).

Towards this end, a Virtual Hyperspectral Image Construction (VHIC) algorithm for a spectral super-resolution is provided for the color-based PUF technology. The mathematical relationship between the RGB and full spectral intensity is described as:

$$x_{3\times 1} = S_{3\times N} y_{N\times 1} + e_{3\times 1} \quad (4)$$

where x is a 3×1 vector corresponding to 3 color intensity values in the R, G, and B channels (x=[R, G, B]$^T$=[I(R), I(G), I(B)]$^T$), S is a 3×N matrix of the RGB spectral response of the 3-color sensor (i.e. smartphone camera), y is a N×1 vector that has the spectral intensity:

$$(y = [I(\lambda_1), I(\lambda_2), \ldots, I(\lambda_N)]^T)$$

where λ is discretized, and e is a 3×1 vector of the system noise with zero mean. The hyperspectral reconstruction for spectral super-resolution from the RGB signal is to obtain $[S_{3\times N}]^{-1}$. However, this inverse calculation is an underdetermined problem such that N>3. To solve $[S_{3\times N}]^{-1}$, we take advantage of fixed-design linear regression with polynomial terms. Using the multiple collections of spectral data and RGB data (i.e. training dataset) acquired by a hyperspectral line-scanning system as well as a smartphone camera, we change the underdetermined problem into an overdetermined problem that can stably be solved by a least squares method. Specifically, $X_{3\times m}$ and $Y_{N\times m}$ are formed by adding $x_{3\times 1}$ and $y_{N\times 1}$ from m different measurements. Thus, the relationship in Eq. (1) is re-written as:

$$X_{3\times m} = S_{3\times N} Y_{N\times m} \quad (5)$$

where $S_{3\times N}$ is the spectral response functions in the R, G, and B channels of the smartphone camera. The relationship in Eq. (5) can be expressed in an inverse format as:

$$Y_{N\times m} = T_{N\times 3} X_{3\times m} \quad (6)$$

where $T_{N\times 3} = [S_{3\times N}]^{-1}$ is the transformation matrix. After incorporating the RGB spectral responses of the camera, this inverse problem is to solve a least-squares problem using QR decomposition, in particular, the QR solver. It should be noted that the final computation is very simple; when RGB data (x=[R, G, B]$^T$=[I(R), I(G), I(B)]$^T$) are substituted into Eq. (6), the corresponding spectral intensity values (y=[I($\lambda_1$), I($\lambda_2$), ..., I($\lambda_N$)]$^T$) are generated with a spectral resolution of 1 nm.

Figures 13A, 13B:
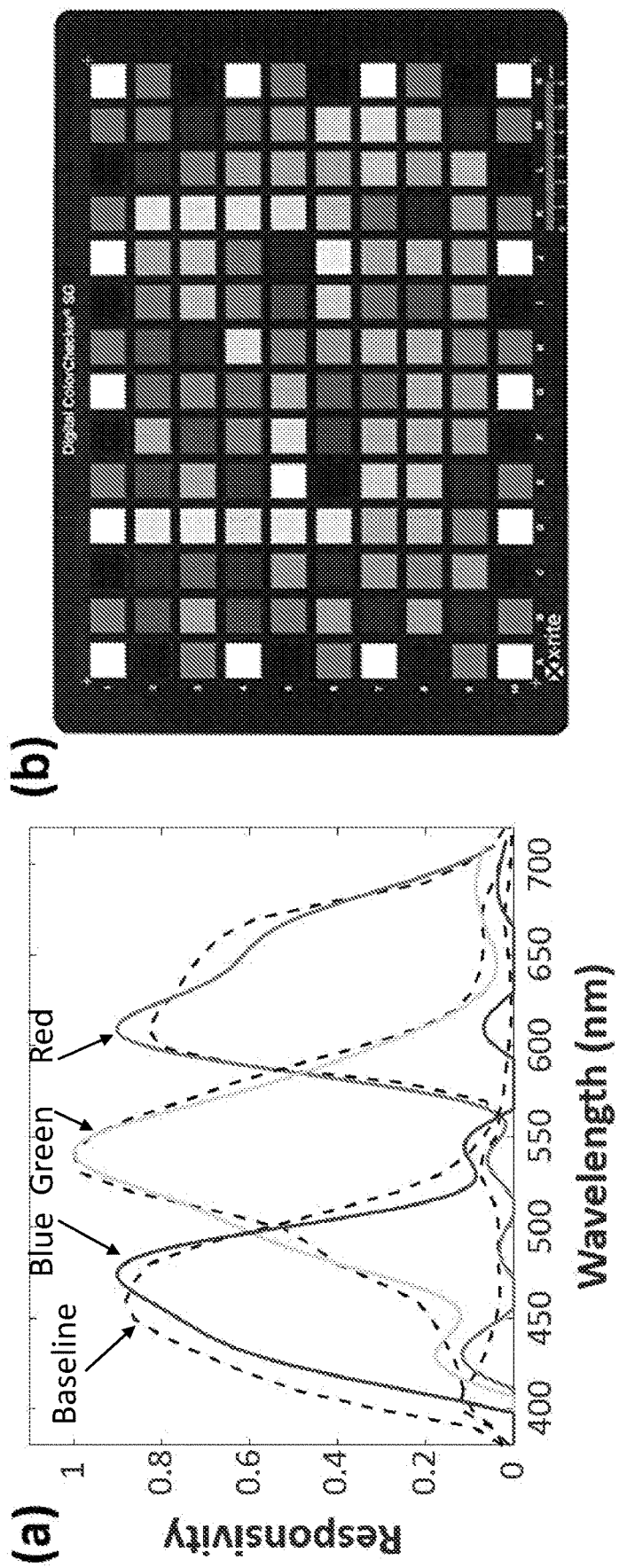
FIG. 13a is a complex graph of responsivity to wavelength measured in nm) in specific models of smartphones used.
FIG. 13b is a color chart reference with 140 distinct color samples.

Based on these relationships, we have established a signal processing framework to extract a digitized key from a reconstructed hyperspectral image dataset of a PUF. The input data for on-dose authentication is a photo (i.e. RGB image) of the PUF on the medicine, taken by a smartphone camera, but the hyperspectral reconstruction of spectral super-resolution generates a rich hyperspectral image dataset. On the PUF, each individual stripe has a unique spectrum described by a random mixture of colored silk microparticles. The authentication process includes comparison of a reconstructed spectrum with the actual spectrum stored in a trusted database. In addition, to implement a universal algorithm necessary to have a database of the spectral response functions in the R, G, and B channels of the built-in camera (as shown in FIG. 13a, which is a complex graph of responsivity to wavelength measured in nm) in specific models of smartphones used. In particular, FIG. 13a, provides example of the spectral response functions of SONY ICX625 measured (solid line) using the above-outlined method, compared with the dashed line obtained from the manufacturer, identified as reference. The spectral response functions in the R, G, and B channels (sensitivity function of the camera) vary from model to model in smartphones. Notably, different smartphone models have different spectral response functions. In this respect, we have developed an affordable method for recovering device spectral response functions using a standard color chart reference with distinct colors (as shown in FIG. 13b, which is a color chart reference with 140 distinct color samples). In this case, compressing sensing (i.e. $l_1$-minimization) is a powerful method to compute the spectral response functions, given that sparsity or compressibility exist in the spectral response functions. Using this method, we measure the RGB spectral response functions of the built-in camera of smartphones which can be used to generate the cryptographic key as discussed above.

Figure 14:
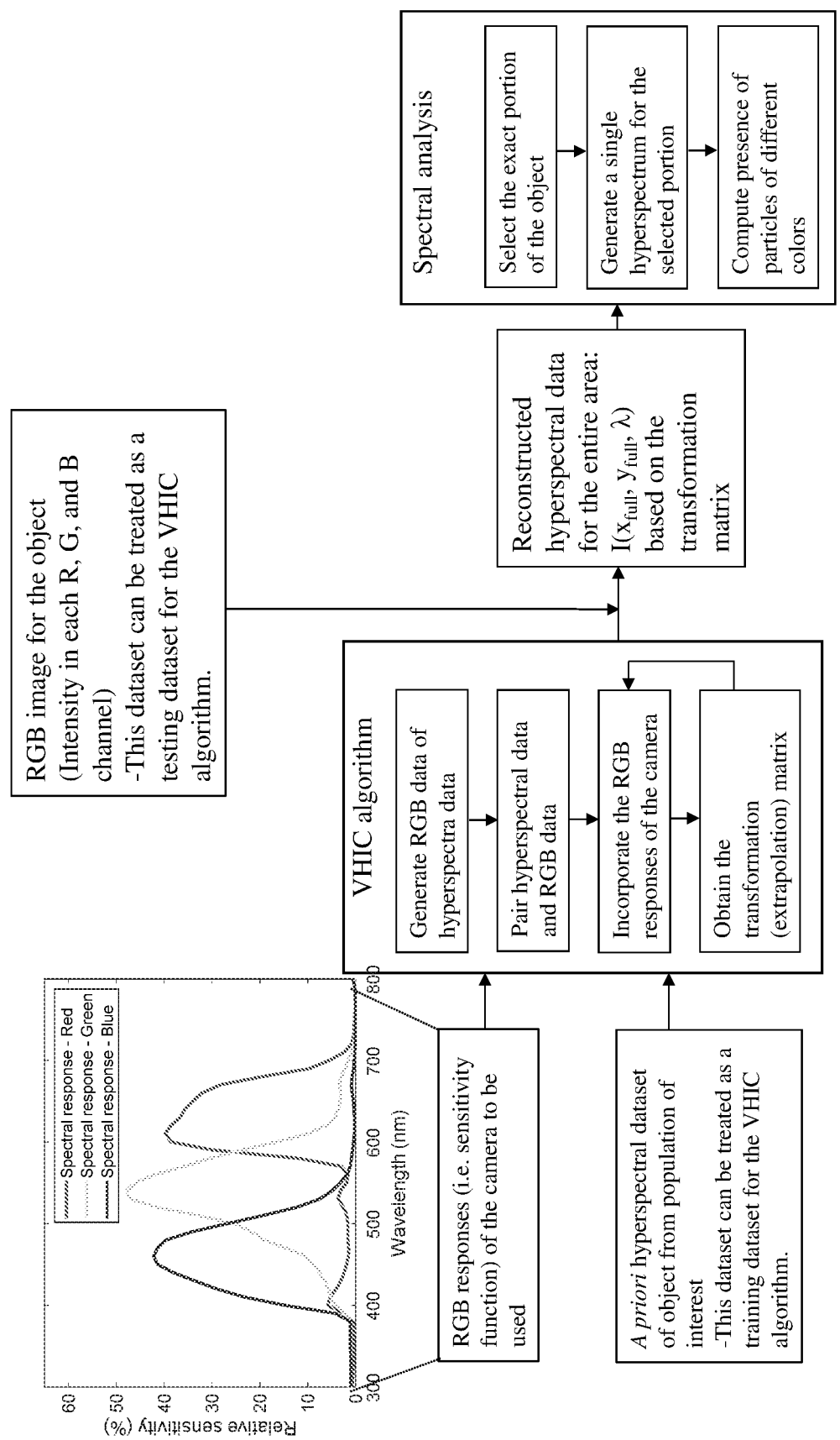
FIG. 14 is a block diagram of a Virtual Hyperspectral Image Construction (VHIC) algorithm which provides conceptual steps of using image data in order to obtain a hyperspectral image.

Referring to FIG. 14, a block diagram of a Virtual Hyperspectral Image Construction (VHIC) algorithm is shown which provides conceptual steps of using image data in order to obtain a hyperspectral image. First, to develop VHIC algorithm, the block diagram uses a priori representative hyperspectral dataset of the object of interest as a population of objects. In addition, the VHIC uses the information on the RGB responses (i.e., spectral responsivity of the image sensor for each RGB channel) of the camera to be used, which can be directly measured or be obtained by the image sensor manufacturer. Then, the RGB responses are applied to the hyperspectral dataset to generate the corresponding RGB dataset of the object that would be acquired by the camera to be used. By pairing the hyperspectral data and the RGB data of the population of interest, a transformation (extrapolation) matrix is obtained to convert object-specific RGB image data into object-specific hyperspectral data. The transformation matrix can be fine-tuned for the specific image sensor of the camera to be used. This is a one-time hyperspectral-to-RGB transformation dataset for the population of interest which can be held in memory. Second, after the VHIC refinement, an RGB image of the object taken by the camera is fed into the VHIC algorithm to measure the RGB parametric data. Third, by applying the transformation matrix to the object-specific RGB dataset, the VHIC then generates the subject-specific hyperspectral data. Using the generated subject-specific hyperspectral dataset, content, e.g., presence of particles having different colors, can then be computed as known to a person having ordinary skill in the art. The constructed hyperspectral reflection data of the object is analyzed using a partial least squares regression model to predict presence of the particles of different colors.

The spectroscopic and VHIC approaches discussed herein are not affected by variations in the illumination and detection of the imaging systems as well as the background ambient room light as follows: The measured spectral intensity $I_m(\lambda)$ reflected from the object in a given location of (x, y) is expressed as a function of the wavelength λ:

$$I_m(\lambda) = L(\lambda) C(\lambda) D(\lambda) r(\lambda) \quad (7)$$

where L(λ) is the spectral shape of the illumination light source,

C(λ) is the spectral response of all optical components in the imaging system (e.g. lenses and diffraction grating), D(λ) is the spectral response of the detector (e.g. mono sensor in the image-guided hyperspectral line-scanning system or three-color RGB sensor embedded in the smartphone), and r(λ) is the true spectral intensity reflected from the object. First, to compensate for the system response (i.e. L(λ) C(λ)D(λ)), we use the reference reflectance standards that have a reflectivity of 99% in the visible range. $I_m(\lambda)$ is normalized by the reflectance measurement $I_{reference}(\lambda)$ of the diffuse reflectance standard in which $r_{reference}(\lambda)=0.99$ in the visible range $$r(\lambda) = \frac{I_m(\lambda)}{I_{reference}(\lambda)} \quad (8)$$

Second, to remove the ambient stray and background light $I_{background}(\lambda)$, two measurements are acquired with the external light source (i.e. white-light LED ring illuminator of the image-guided hyperspectral line-scanning system and built-in flashlight LED of the smartphones) on and off. The measurements are repeated without the sample while the illumination is kept on. Finally, r(λ) is calculated by subtracting $I_{background}(\lambda)$ from each measurement such that:

$$r(\lambda) = \frac{I_m(\lambda) - I_{background}(\lambda)}{I_{reference}(\lambda) - I_{background}(\lambda)} \quad (9)$$

It should be noted that the built-in data acquisition step to factor out the contributions of room light conditions and different smartphone models provide a unique advantage to reliably detect presence of particles on the object.

VHIC allows for the mathematical reconstruction of the full spectral information from an RGB image taken by a conventional camera (i.e. three-color information from R, G, and B channels). The mathematical relationship between the full spectrum and the RGB intensity is described as $$x = Sr + e \quad (10)$$

where x is a vector corresponding to the reflection intensity in each R, G, and B channel, S is a matrix of the RGB spectral responses of the three-color sensor, r is a vector of the spectral intensity reflected from the object, and e is a vector of the system noise. In our case, the hyperspectral construction from the RGB signal is an inverse problem such that the number of actual measurements (i.e. three-color information) is less than the dimensionality of the full spectrum with $\lambda = \lambda_1, \lambda_2, \ldots, \lambda_N$. We took advantage of fixed-design linear regression with polynomial features to reliably construct the full spectral information $r(\lambda_1, \lambda_2, \ldots, \lambda_N)$ from the RGB signals x(R, G, B) of the three-color RGB sensor embedded in the smartphone. As discussed above, the measured RGB intensity is described explicitly:

$$x_{3\times 1} = S_{3\times N} r_{N\times 1} + e_{3\times 1} \quad (11)$$

In our case, r ($\lambda = \lambda_1, \lambda_2, \ldots, \lambda_N$) is discretized from 450 nm to 679 nm with a spectral interval of 1 nm. We take advantage of fixed-design linear regression to reconstruct hyperspectral data from RGB images. We paired the hyperspectral reflection dataset (acquired by the image-guided hyperspectral line-scanning system) and the RGB dataset (acquired by the RGB camera). It should be noted that the RGB dataset can also be generated by applying the RGB spectral responses to the hyperspectral dataset. $X_{3\times m}$ and $R_{N\times m}$ are formed by adding $x_{3\times 1}$ and $r_{N\times 1}$ from m different measurements. The relationship in Equation (5-1) is as provided above described as:

$$X_{3\times m} = S_{3\times N} R_{N\times m} \quad (12)$$

which can be expressed as:

$$R_{N\times m} = T_{N\times 3} X_{3\times m} \quad (13)$$

where the transformation (or extrapolation) matrix as discussed above is $T_{N\times 3} = [S_{3\times N}]^{-1}$. If Equation (13) is solved for the unknown $T_{N\times 3}$, then $T_{N\times 3}$ can be used to transform the RGB dataset into the hyperspectral reflection dataset. Each three-color sensor model in different cameras has unique RGB spectral responses with spectral overlaps among the R, G, and B channels (also known as the sensitivity function of the camera of SAMSUNG GALAXY J3). To effectively incorporate the RGB spectral response of the camera, we expanded $X_{3\times m}$ to $\hat{X}_{p\times m}$ for maximizing the accuracy of the hyperspectral reconstruction such that:

$$R_{N\times m} = \hat{T}_{N\times p} \hat{X}_{p\times m} \quad (14)$$

here $\hat{X}_{p\times m}$ can be expressed explicitly such that:

$$\hat{X}_{p\times m} = \begin{bmatrix} R_1 & G_1 & B_1 & \cdots & R_1^i & G_1^i & B_1^i & R_1G_1 & G_1B_1 & B_1R_1 & \cdots & (R_1G_1)^j & (G_1B_1)^j & (B_1R_1)^j & R_1G_1B_1 & \cdots & (R_1G_1B_1)^j \\ \vdots & \vdots & \vdots & & \vdots & \vdots & \vdots & \vdots & \vdots & \vdots & & \vdots & \vdots & \vdots & \vdots & & \vdots \\ R_m & G_m & B_m & \cdots & R_m^i & G_m^i & B_m^i & R_mG_m & G_mB_m & B_mR_m & \cdots & (R_mG_m)^j & (G_mB_m)^j & (B_mR_m)^j & R_mG_mB_m & \cdots & (R_mG_mB_m)^j \end{bmatrix}^T \quad (15)$$

where the exact powers of i and j of the single and cross terms are uniquely determined for a specific three-color sensor model, by checking the error between the reconstructed hyperspectral data and the original data.

The inverse of the expanded transformation matrix $\hat{T}$ in Equation (14) can be considered to be the minimum-norm-residual solution to $R = \hat{T}\hat{X}$. Typically, this inverse problem is to solve a least-squares problem. We used QR decomposition, in particular the QR solver. After QR factorization is applied to $\hat{X}$, $\hat{T}$ is estimated by minimizing the sum of the squares of the elements of $R - \hat{T}\hat{X}$ and is selected such that the number of nonzero entries in $\hat{T}$ is minimized. Overall, the computation of the transformation (extrapolation) matrix establishes VHIC, eliminating a need of bulky dispersion hardware components (e.g. spectrometer, spectrograph, mechanical filter wheel, or liquid crystal tunable filter).

Those having ordinary skill in the art will recognize that numerous modifications can be made to the specific implementations described above. The implementations should not be limited to the particular limitations described. Other implementations may be possible.

The invention claimed is:

1. A method of authenticating an item, comprising:
randomly distributing one or more types of edible fluorescent particles on to an area of an item (Area), thus generating a physical unclonable function on the item based on locations of the edible fluorescent particles and illumination wavelength;
applying light to the Area;
capturing one or more images from the Area;
binarizing each of the one or more images by associating a "1" or a "0" to each pixel in the one or more images whereby a "1" is assigned to a pixel representing a local highest fluorescent intensity within each of the edible fluorescent particles and a "0" is assigned to all other pixels, thereby determining a spatial location based on location of a pixel with the maximum intensity for each edible fluorescent particle;
generating a cryptographic pattern from the one or more captured images based on the determined spatial locations by a host processing system;
communicating the cryptographic pattern to a remote processing system having a plurality of cryptographic keys in a database each uniquely associated with a corresponding item;
comparing the cryptographic pattern with the plurality of cryptographic keys in the database; and
communicating a positive evaluation for authentication to the host processing system if a match is found between one of the plurality of cryptographic keys and the communicated cryptographic pattern, else communicating a negative evaluation,
wherein the one or more types of edible fluorescent particles are chosen from the group consisting of enhanced cyan fluorescent protein (eCFP), enhanced green fluorescent protein (eGFP), enhanced yellow fluorescent protein (eYFP), and mKate2 (far-red) fluorescent protein.

2. The method of claim 1, wherein the evaluation for authentication is based on a statistical match between one of the plurality of cryptographic keys and the cryptographic pattern.

3. The method of claim 2, wherein the statistical match is based on linear regression with a predetermined threshold for a P-value.

4. The method of claim 1, further comprising:
reducing noise in the one or more captured images;
detecting the one or more types of edible fluorescent particles amongst N×M pixels in the one or more captured images; and
compressing the binarized data stream in order to generate the cryptographic pattern.

5. The method of claim 4, wherein the compression of the binarized data is based on a von Neumann compression.

6. The method of claim 4, further comprising filtering the light source to provide selective wavelengths.

7. The method of claim 6, wherein the one or more types of edible fluorescent particles include a plurality of fluorescent compounds, each generating a different fluorescence in response to a selected light wavelength, whereby the cryptographic pattern is a linear combination of the compressed binarized data stream associated with sequentially generated fluorescence responses.

8. A system of authenticating an item, comprising:
a remote processing system, configured to hold a plurality of cryptographic keys in a database each uniquely associated with a corresponding item;
a light source, configured to apply light to an area of an item (Area), wherein the Area includes a random distribution of one or more types of edible fluorescent particles disposed thereon, thus generating a physical unclonable function on the item based on locations of the edible fluorescent particles and illumination wavelength;
an image capture device having an N×M imaging sensor, configured to capture one or more images each having NM pixels from the Area;
a host processing system, configured to:
capture one or more images from the Area utilizing the image capture device;
binarize each of the one or more images by associating a "1" or a "0" to each pixel in the one or more images whereby a "1" is assigned to a pixel representing a highest fluorescent intensity within each of the edible fluorescent particles and a "0" is assigned to all other pixels, thereby determine a spatial location based on location of a pixel with the maximum intensity for each edible fluorescent particle;
generate a cryptographic pattern from the captured image; and
communicate the cryptographic pattern to the remote processing system,
wherein the remote processing system is configured to compare the cryptographic pattern with the plurality of cryptographic keys in the database, and communicate a positive evaluation for authentication to the host processing system if a match is found between one of the plurality of cryptographic keys and the received cryptographic pattern, else communicate a negative evaluation,
wherein the one or more types of edible fluorescent particles are chosen from the group consisting of enhanced cyan fluorescent protein (eCFP), enhanced green fluorescent protein (eGFP), enhanced yellow fluorescent protein (eYFP), and mKate2 (far-red) fluorescent protein.

9. The system of claim 8, wherein the evaluation for authentication is based on a statistical match between one of the plurality of cryptographic keys and the cryptographic pattern.

10. The system of claim 8, wherein the statistical match is based on linear regression with a predetermined threshold for a P-value.

11. The system of claim 8, wherein the host processing system is further configured to:
reduce noise in the one or more captured images;
detect the one or more types of edible fluorescent particles amongst the N×M pixels in the one or more captured images; and
compress the binarized data stream in order to generate the cryptographic pattern.

12. The system of claim 11, wherein the compression of the binarized data is based on a von Neumann compression.

13. The system of claim 11, wherein the light source is filtered to provide selective wavelengths.

14. The system of claim 13, wherein the one or more types of edible fluorescent particles include a plurality of fluorescent compounds, each generating a different fluorescence in response to a selected light wavelength, whereby the cryptographic pattern is a linear combination of the compressed binarized data stream associated with sequentially generated fluorescence responses.

15. A method of authenticating an item, comprising:
applying light to an are of an item (Area), wherein the Area includes a distribution of colored particles disposed thereon, thus generating a physical unclonable function on the item based on locations of the colored particles and illumination wavelength;
capturing one or more RGB images from the Area by an image capturing device, each RGB image producing a channel data stream from one of Red, Green, and Blue channels of the device;
binarizing each of the one or more images by associating a "1" or a "0" to each pixel in the one or more images whereby a "1" is assigned to a pixel representing a local highest fluorescent intensity within each of the edible fluorescent particles and a "0" is assigned to all other pixels, thereby determining a spatial location based on location of a pixel with the maximum intensity for each edible fluorescent particle;
generating a cryptographic pattern from the one or more captured RGB images by a host processing system, based on:
receiving a hyperspectral dataset representing a priori hyperspectral data of items of a population of interest;
pairing the corresponding Red, Green, and Blue data streams with the hyperspectral dataset,
obtaining a transformation matrix adapted to convert an item-specific RGB image dataset into an item-specific hyperspectral dataset for the image capturing device,
generating an item-specific hyperspectral dataset using the transformation matrix,
determining the cryptographic pattern from the item-specific hyperspectral dataset;
communicating the cryptographic pattern to a remote processing system having a plurality of cryptographic keys in a database each uniquely associated with a corresponding item;
comparing the cryptographic pattern with the plurality of cryptographic keys in the database; and
communicating a positive evaluation for authentication to the host processing system if a match is found between one of the plurality of cryptographic keys and the communicated cryptographic pattern, else communicating a negative evaluation,
wherein the colored particles are chosen from the group consisting of enhanced cyan fluorescent protein (eCFP), enhanced green fluorescent protein (eGFP), enhanced yellow fluorescent protein (eYFP), and mKate2 (far-red) fluorescent protein.

16. The method of claim 15, wherein the evaluation for authentication is based on a statistical match between one of the plurality of cryptographic keys and the cryptographic pattern.

17. The method of claim 16, wherein the statistical match is based on linear regression with a predetermined threshold for a P-value.

18. The method of claim 15, further comprising:
reducing noise in the one or more captured RGB images;
detecting the colored particles amongst NM pixels in the one or more captured RGB images; and
compressing the binarized data stream in order to generate the cryptographic pattern.

19. The method of claim 18, wherein the compression of the binarized data is based on a von Neumann compression.

20. The method of claim 15, wherein the colored particles include a plurality of fluorescent compounds, each generating a different fluorescence in response to a selected light wavelength, whereby the cryptographic pattern is a linear combination of the compressed binarized data stream associated with sequentially generated fluorescence responses.

* * * * *